US012560718B2

(12) United States Patent
Ran et al.

(10) Patent No.: US 12,560,718 B2
(45) Date of Patent: Feb. 24, 2026

(54) SYSTEMS AND METHODS FOR INFLUENCING BEHAVIOR AND DECISION MAKING THROUGH AIDS THAT COMMUNICATE THE REAL TIME BEHAVIOR OF PERSONS IN A SPACE

(71) Applicants: Yahav Ran, Woodinville, WA (US);
Assaf Margalit, Woodinville, WA (US);
John Diamond, Merritt Island, FL
(US); Mark Yoffe, Woodinville, WA
(US)

(72) Inventors: Yahav Ran, Woodinville, WA (US);
Assaf Margalit, Woodinville, WA (US);
John Diamond, Merritt Island, FL
(US); Mark Yoffe, Woodinville, WA
(US)

(73) Assignee: Synect, LLC, Orlando, FL (US)

( * ) Notice: Subject to any disclaimer, the term of this patent is extended or adjusted under 35 U.S.C. 154(b) by 284 days.

(21) Appl. No.: 17/624,193

(22) PCT Filed: Aug. 10, 2021

(86) PCT No.: PCT/US2021/045410
§ 371 (c)(1),
(2) Date: Dec. 30, 2021

(87) PCT Pub. No.: WO2022/035876
PCT Pub. Date: Feb. 17, 2022

(65) Prior Publication Data
US 2023/0251381 A1     Aug. 10, 2023

Related U.S. Application Data

(60) Provisional application No. 63/063,887, filed on Aug. 10, 2020.

(51) Int. Cl.
*G01S 17/89* (2020.01)
*G01S 17/04* (2020.01)

(52) U.S. Cl.
CPC .............. *G01S 17/89* (2013.01); *G01S 17/04* (2020.01)

(58) Field of Classification Search
CPC ...................................................... G01S 17/89
See application file for complete search history.

(56) References Cited

U.S. PATENT DOCUMENTS

| | | | | |
|---|---|---|---|---|
| 10,225,707 | B1 * | 3/2019 | Scheper | G06Q 30/0281 |
| 2017/0225336 | A1 * | 8/2017 | Deyle | B25J 11/008 |
| 2018/0307913 | A1 * | 10/2018 | Finn | G06V 20/53 |
| 2019/0320898 | A1 * | 10/2019 | Dirghangi | A61B 3/0033 |
| 2020/0082551 | A1 * | 3/2020 | Steiner | G06T 7/277 |
| 2020/0226705 | A1 * | 7/2020 | Brans | G08B 21/22 |
| 2020/0252233 | A1 * | 8/2020 | O'Keeffe | H04L 12/2818 |
| 2021/0321063 | A1 * | 10/2021 | Abramov | G06T 7/80 |
| 2024/0184012 | A1 * | 6/2024 | Mazur | G01S 7/003 |

* cited by examiner

*Primary Examiner* — Travis R Hunnings
(74) *Attorney, Agent, or Firm* — Kyle Straughan; Holland & Knight LLP

(57) ABSTRACT

This present invention provides a system, device, and method for influencing the behavior and decision-making process of persons occupying a given space through perceptible indicia that influence such persons making their choice of location in the space in real time using detection devices, a computer system, and indicator devices positioned within the space.

20 Claims, 17 Drawing Sheets

SYSTEMS AND METHODS FOR INFLUENCING BEHAVIOR AND DECISION MAKING THROUGH AIDS THAT COMMUNICATE THE REAL TIME BEHAVIOR OF PERSONS IN A SPACE

PRIORITY CLAIM

This application claims priority to and/or the benefit of U.S. provisional patent application Ser. No. 63/063,887 filed Aug. 10, 2020. The foregoing application is incorporated by reference in its entirety as if fully set forth herein.

FIELD OF THE INVENTION

This invention relates generally to a system, device, and method for influencing the behavior and decision-making process of individuals and groups through perceptible indicia that communicate real time behavior of persons in a space.

BACKGROUND OF THE INVENTION

Recent viral pandemics have increased public concern for public health and safety, especially in regard to mitigating potential viral or bacterial transmission of contaminants between persons in generally crowded spaces. Increased awareness by the public of the potential for such transmission has led to a necessity for systems, methods, and devices, as disclosed herein, capable of assisting the public with practical measures adopted to protect individuals from such transmission. However, there are many public and private spaces that were designed prior to the growing awareness, or without consideration for concepts such as social distancing, and as such the public requires systems capable of mitigating the risks in such spaces, as well as generally reducing disease transmission risk in places even designed to help mitigate it. Currently, conventional technologies and approaches to such problems are expensive, must be built into a space at conception, can require years of construction, require high maintenance fees, and/or are not always effective.

By utilizing a series of modular devices and components, these challenges can be overcome, allowing for the owners of public and private spaces to monitor the movement of persons through their space and utilize mechanisms to notify such visitors of potential risks or generally guide their choice of location. The disclosed invention uses a variety of information devices configured to provide information to persons in a space, detection devices configured to detect persons in a space, and a computer system designed to incorporate information provided by the detection devices and provide instruction to the information devices.

Thus an owner or operator of a space can use the information devices, as described herein, to encourage persons to congregate in or avoid certain areas of a space, potentially reducing population density in a given space and reducing the risk of transmission of viral infections.

BRIEF SUMMARY

The present invention allows the owners and/or operators of public and private spaces to help their visitors and guests make informed decisions about where to locate themselves in a space to minimize viral transmission or other risks. For example, an airport could recommend places for passengers to wait where the density of persons is lower, thus reducing the risk of transmission of viral infection. Alternatively, a convention could utilize the present invention to indicate areas of high crowds and offer alternative paths to guests to reach certain areas or attempt to guide them to areas that have lower crowds.

The invention uses a series of modular sensors, display devices, and computer components to detect the density of persons in a given space at a given time, and then, if desired by an operator or owner, uses the display devices to make recommendations to persons to venture to places of lower density. The invention can also detect how frequently certain areas are cleaned or otherwise maintained by recognizing certain types of persons based on a variety of factors.

BRIEF DESCRIPTION OF THE DRAWINGS

Embodiments of the present invention are described in detail below with reference to the following drawings:

FIGS. 4A and 4B depict front and side views respectively of a display monitor totem in accordance with an embodiment of the invention;

FIG. 11 is a perspective view of the system demonstrating tracking of an individual as they move through a specified area and near certain totems, with multiple detection devices tracking the person in accordance with an embodiment of the invention;

3

Figure 14:
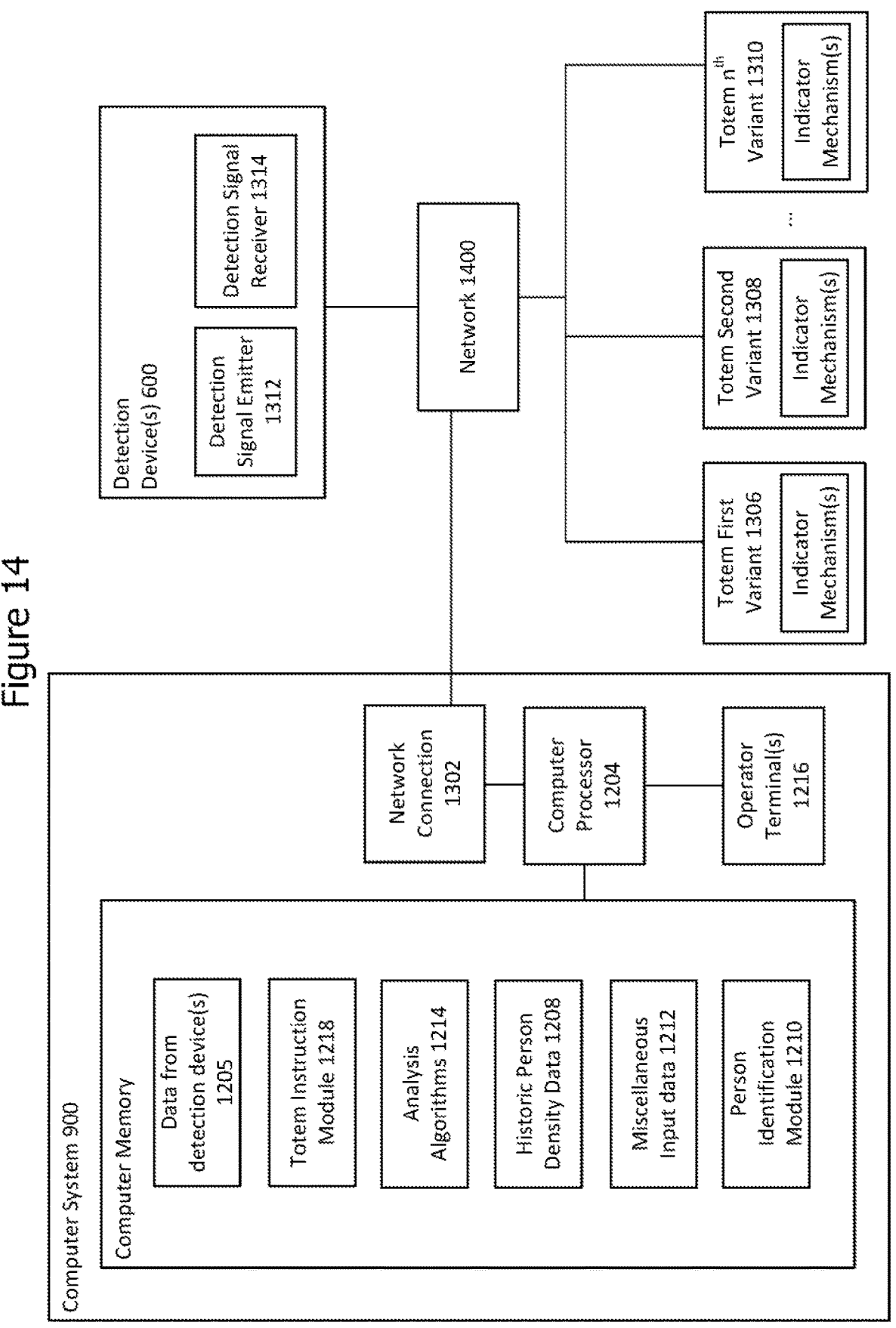
Figure 15:
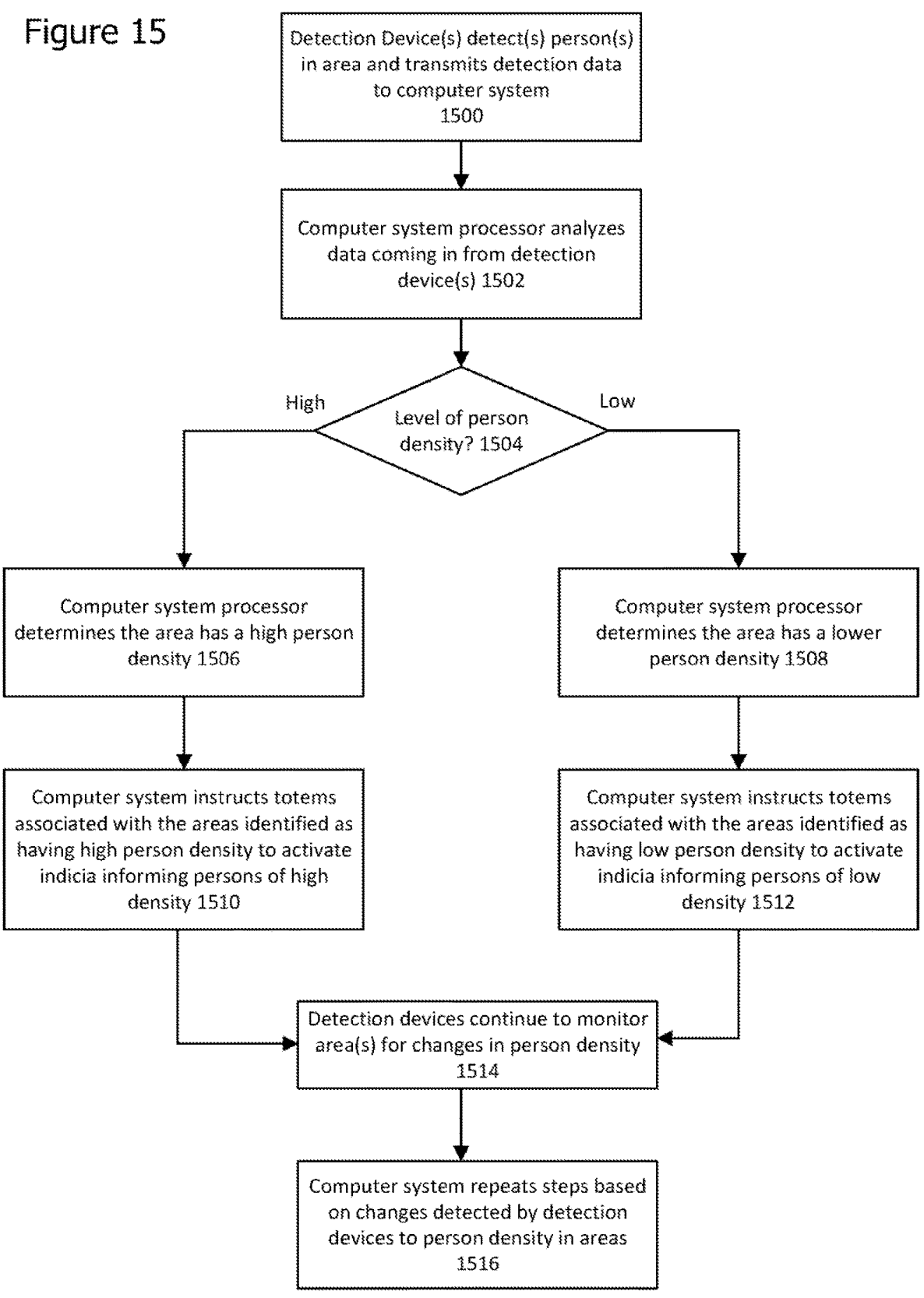
Figure 16:
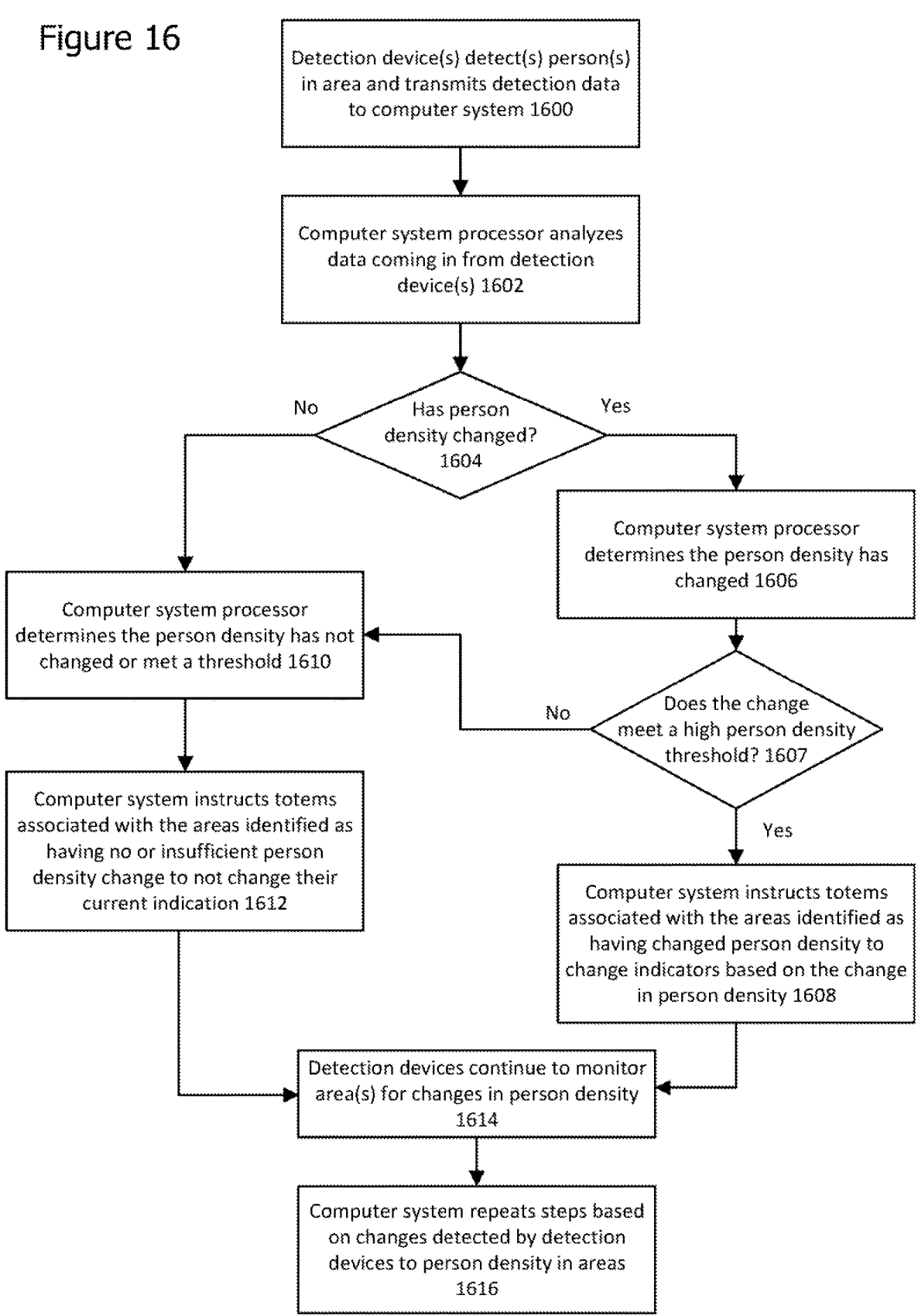
Figure 17:
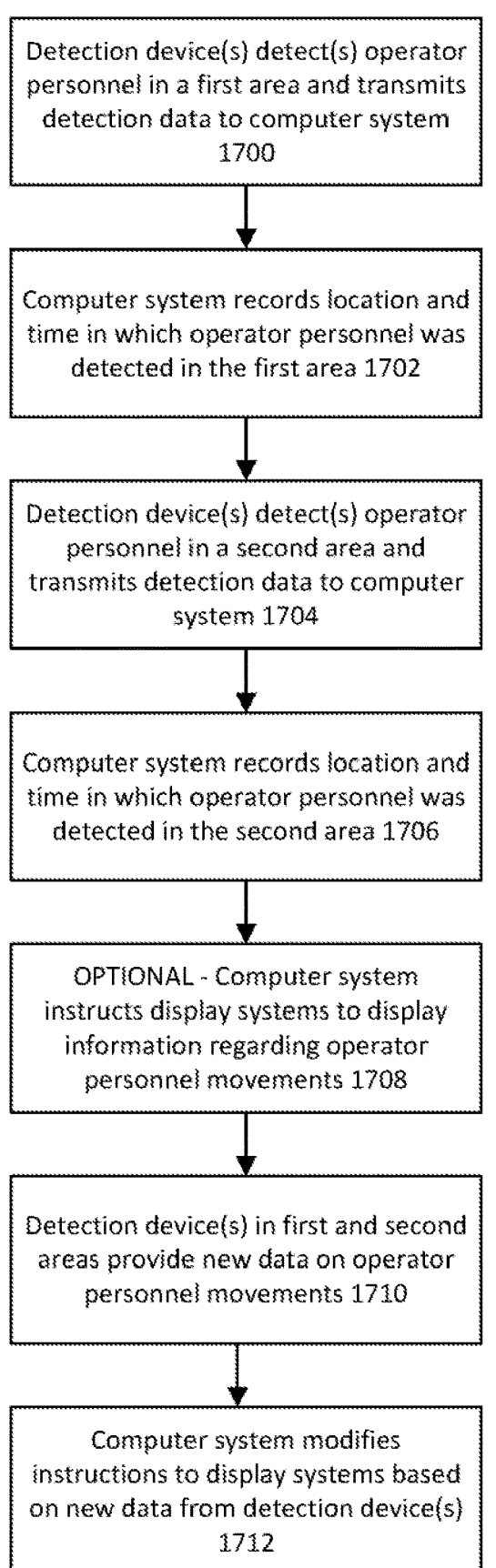

FIG. 14 is a system diagram showing the connections between the computer system, detection devices, and totems where the computer system is located outside of the network of the space being operated;

FIG. 15 is a flow-diagram demonstrating how an embodiment of the invention may make determinations regarding person density in an area and indicate such density using an information totem;

FIG. 16 is a flow-diagram demonstrating how an embodiment of the invention actively scan the space being monitored and make real-time determinations of how to utilize totems and their indicators; and FIG. 17 is a flow-diagram showing how the system may track an individual through the space in order to record when certain personnel have maintained or otherwise interacted with a space in accordance with an embodiment of the invention.

DETAILED DESCRIPTION

This invention relates generally to a system, device, and method for influencing the behavior and decision-making process of individuals and groups through visual and auditory aids that communicate real time behavior of persons in a space. Specific details of certain embodiments of the invention are set forth in the following description and in the figures to provide a thorough understanding of such embodiments. The present invention may have additional embodiments, may be practiced without one or more of the details described for any particular described embodiment, or may have any detail described for one particular embodiment practiced with any other detail described for another embodiment.

As used herein and unless otherwise indicated, the terms "a" and "an" are taken to mean "one", "at least one" or "one or more". Unless otherwise required by context, singular terms used herein shall include pluralities and plural terms shall include the singular.

Unless the context clearly requires otherwise, throughout the description and the claims, the words 'comprise', 'comprising', and the like are to be construed in an inclusive sense as opposed to an exclusive or exhaustive sense; that is to say, in the sense of "including, but not limited to". Words using the singular or plural number also include the plural and singular number, respectively. Additionally, the words "herein," "above," and "below" and words of similar import, when used in this application, shall refer to this application as a whole and not to any particular portions of the application.

DESCRIPTION OF INVENTION

The invention herein comprises a system and method of tracking the movement of individuals and other important health information in a space, processing that information to derive information including, but not limited to, health and safety information about the space, and to provide recommendations based on the information processing to individuals within the space and/or the operators of said space. The system can encourage the decision-making process of people in a space, and possibly encourage them to modify their behavior through use of various notification mechanisms. Furthermore, the presently disclosed system can provide guidance to individuals who are attempting to determine safer places to go in a space, but can also be applied in emergency situations to help direct persons in a space to safety.

In some embodiments, the invention comprises a number of sensors or detection means, which may be, but are not limited to, LiDAR sensors capable of capturing three dimensional images; a computer system containing at least one computer processor configured to interpret data from the LiDAR sensors and make determinations about how many individuals have moved through an area or are located in specific places in said area, or determine how recently an area has been cleaned; one or more output stations which may include, but are not limited to, colored-light emitting totems capable of indicating areas of high risk or traffic, or dynamic information totems capable of displaying dynamic maps of areas showing areas of high risk or traffic. In some embodiments, the system may further comprise audio systems capable of providing audio information about the status of the space. In some embodiments, the space is an enclosed area, while in others it may be outdoors or otherwise accessible to the public; for example, the system may be implemented in an airport to allow the airport operators to detect areas of high traffic during a pandemic and redirect visitors to areas with lower traffic density to reduce risk of infection.

In some embodiments, the system can provide both long-term and short-term recommendations for how to utilize a space, both to individuals currently in that space and to the operators of the space. Such information could include, but is not limited to, informing space owners of areas where individuals frequently touch certain fixtures, so that the operator can ensure that such fixtures are frequently cleaned and/or disinfected. In some embodiments, the sensors could detect the number of people who enter a restroom and provide visitors to a space with information regarding the occupancy level of said restroom.

In some embodiments, the sensor and detection means, one or more detection devices, could comprise, but is not limited to, sonar or radar sensors, image recognition from cameras, pressure sensors under floors designed to detect human or similar weights, passive optical "trip" lines or similar inventions, or a combination of the foregoing with the LiDAR or similar systems. The system could also be configured to function with other camera-based systems, or other mechanisms utilized to observe areas and potentially track human movement. The nature of the system would also enable it to function with other yet-to-be-invented means of detection. In one or more embodiments, the system may utilize LiDAR or ultrasonic rangefinders in order to generate a view of the area around the detection device. When multiple detection devices are implemented, the computer processor may utilize software to piece together an image of the area monitored by the detection devices by combining the results of their detection.

In one or more embodiments, the system utilizes the data from the detection devices to determine whether objects in an area are persons. In some embodiments, this may be done by recognizing common landmarks of the human body such as arms, the legs, or head and seeing if the detected images match such landmarks. Other implementations may utilize image recognition to attempt to fit the shapes detected by detection devices to known silhouettes of human persons.

In some embodiments, the system can detect and inform administrators or visitors about health and safety issues including, but not limited to, violations of "social distancing" or similar health requirements by guests. In some embodiments, triggering a threshold of a certain number of violations could result in escalating levels of warning; such as audio or visual indications on informational totems, or reporting to a security or safety force to notify them of the need to intervene.

Some embodiments could track varieties of data, including, but not limited to, whether occupants in the space are complying with social distancing guidelines; occupancy counts for the space or a particular portion of the space; detection of how recently certain areas were cleaned or sanitized; compare records of cleaning with records of contact to show areas that require more attention, or monitoring vapor trails or other airflow through a space to make determinations of airborne infection risk.

In some embodiments, the informational totems could take on a variety of shapes, and could be screens placed on walls or hanging from ceilings; they could take the form of ground based systems whereby certain locations on the ground use lights or other means to indicate safe areas; there could be devices capable of providing audio output in the form of messages or sounds; they could be a freestanding totem that uses lights, screens, or audio cues to provide instruction to nearby individuals; or they could take the form of a combination of the foregoing. There may be a single informational totem, or many depending on the needs of the space, and various types could be used in combination in order to provide information in a variety of ways. In some embodiments the totems are all identical, while in others a mixed variety of totems may be used in order to suit the needs of the owner of the space in question. Herein these informational or display totems may be referred to simply as "totems" though they are not constrained to be tall standing structures; in some cases a totem may be a sign placed on a wall or ceiling, or may be attached to an existing component of a space such as, but not limited to, a decorative feature or door.

In some embodiments, the computer processor may connect with the informational totems to provide dynamic messages and real-time information about the data being tracked. Such uses could involve, but are not limited to, providing information to guests in a space about where the likelihood of viral infection is lowest; or where they might be able to find quiet spaces. In some embodiments, the system could be configured to provide information through a software application such as, but not limited to, a smartphone application, or by sending "push" or similar notifications to guests. The system may also integrate with third party software applications or software to provide additional information to users, for example, showing where large crowds are in a shopping area to allow a user to make more informed decisions about where to shop or eat. In some examples, the computer processor may be configured to learn or adapt over time to be able to predict likely outcomes from numbers of occupants or data, and provide recommendations in advance.

Some embodiments of the invention are configured to be able to differentiate between persons in a space based on a variety of criteria. For example, the invention may be comprised of certain detectors capable of determining whether a person is carrying a tag or other identifier such as a badge, and from there determine who such person is. The system may also be configured to be able to determine different kinds of people from the subset of those who carry certain tags or identifiers. In practice, this may take the form of recognizing a security officer or maintenance personnel, and the system may be able to determine the difference between the two. As a result, the system can determine whether areas are adequately being patrolled by security personnel, or if certain areas are being frequented and cleaned by maintenance personnel. The same approach could be used for other forms of personnel. In some cases, the invention may utilize sensors capable of facial recognition in order to identify specific persons in a space, which specific persons may be recorded in a memory system and potentially be associated with a role. The invention may also be configured to specifically track employees of a space owner or operator, in order to enable the owner or operator to review work patterns, manage the employees, or ensure each area of the space is receiving adequate attention.

In some embodiments, the system utilizes detectors capable of detecting humans, and may or may not be capable of detecting specific human beings. Such sensors are also capable of detecting multiple humans, even when clustered together, using LiDAR, possibly in combination with thermal or other sensors, and determining how many persons are in a specific cluster. Other embodiments may utilize other detection means than LiDAR but with similar effect, such as thermal imaging. In some embodiments, multiple detection means may be combined to create three dimensional images of an area that the computer system can utilize to make determinations of whether objects detected are humans. The system can do so by utilizing data, software, and/or algorithms programmed to use the data from the LiDAR detection devices to make determinations of which objects the LiDAR detection devices have detected as humans based on a variety of mechanisms, such as, but not limited to, silhouette recognition, image recognition, human body landmark recognition, estimation based on approximate shape, or other means. Where only part of a person is visible to the system, the system may estimate based on such factors, or other data provided by software or the operator, or use its detection means to analyze for edge cases, such as a person sitting in a chair or leaning against an object. Over time, such systems can also be trained by operators, use of machine learning, or artificial intelligence. Where there are potential humans clustered in an area, the system may estimate based on the approximate size of the cluster, may attempt to determine individuals in the cluster, or may attempt to combine such methods, or use other methods known in the art to determine the cluster size.

In some embodiments, the display devices used to guide and inform persons may be totem-like in shape, with an indicator light located somewhere on the totem that is configured to be able to illuminate in one or more colors. These colors could utilize existing social schema for safety to help inform persons. For example, the totems could be configured to display, red, yellow, and green colors, which many persons familiar with that combination would interpret as indicating danger, caution, and safety respectively. Depending on the nature of the premises being monitored and the social customs of the area, alternative indicators might be utilized as warning methods.

In some embodiments, the display devices may be equipped with display monitors capable of providing more detailed information to persons visiting the area. For example, such monitors could be capable of providing written or image-based messages, such as showing maps of the area in question and indicating on such maps where there are high and/or low levels of person density, allowing the guest to choose to avoid such high density areas. In some embodiments, the display screen may also be configured to show routes a person can take to avoid areas of high density, or routes that meet other parameters requested by a user or determined by an operator. The display device may also be configured to display information in word form, such as notifying persons of areas of high density by name, or providing other warning messages for them to be aware of. Some embodiments of the invention may utilize both the display device with indicators and those with monitors, and some embodiments may utilize display devices comprised of both monitors and indicator lights, and may also utilize other tools such as speakers or means of communication.

A key advantage of this invention is the fact that the persons in the space do not need to wear a special indicator or other means to ensure they are detected; instead the system is configured and capable of detecting and determining whether an object is a person. Thus this system does not require additional administrative load or inconvenience on persons visiting the space being monitored. For example, some systems in the art require persons in the space to wear special items or devices that a detection means is able to track, thus to ensure social distancing or other conditions the operator of the space is required to provide such tracking devices to all guests and persons therein. The present invention solves this problem by eliminating the need for such tracking devices and instead relies on sensors capable of detecting and identifying human persons in the space.

Figure 1:
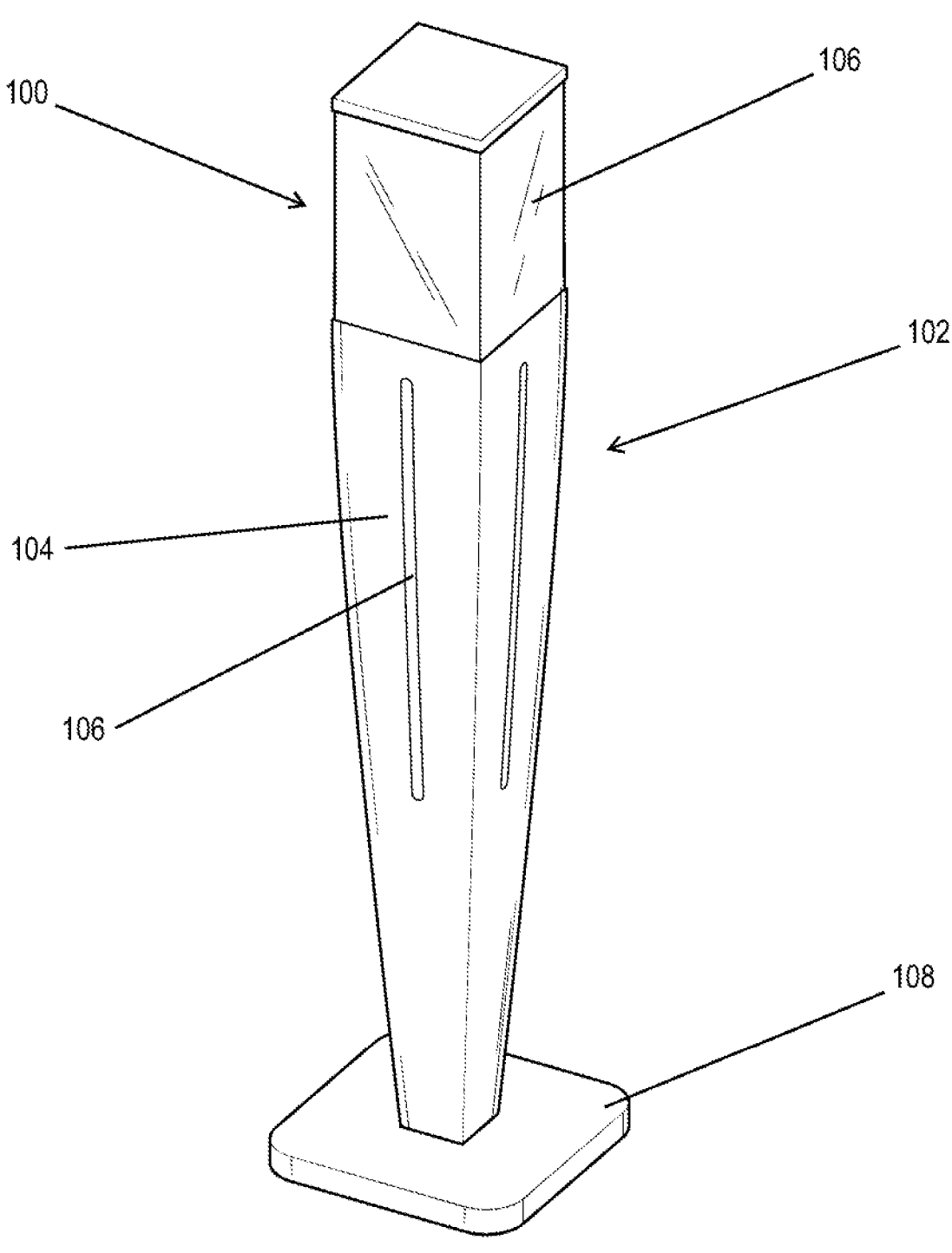
FIG. 1 is a perspective view of an information totem device in accordance with an embodiment of the invention.

FIG. 1 depicts an example of an information totem 102 configured with one or more indicators 106 as an embodiment of the invention that can be utilized by the system in order to provide contextual information to persons within a space.

The system is comprised of one or more varieties of totem 100, including an information totem 102, may have a housing 104, one or more indicators 106, and a base 108. The totem 100, including the information totem 102 can be configured in a number of ways depending on the needs of the implementation of the system.

In some embodiments, an informational totem 102 is comprised of a totem 100 that is removably affixed to the ground, is relatively narrow and thin, is approximately six to eight feet tall, and has an indicator positioned near the top of the totem 102.

In some embodiments, the information totem 102 is configured with an indicator 106 that may be a light source that is capable of displaying one or more different colors of light. The indicator 106 light source may be capable of emitting colors of light such as, but not limited to, red, yellow, green, or blue. The light source may be comprised of a light emitting diode or conventional filament light bulb, or may be comprised of a pixel-based screen component. Other embodiments of the invention may have information totems 102 that utilize yet undeveloped light source components. In some embodiments, the indicator 106 light source may be capable of changing how it emits light, such as, but not limited to: brightening or darkening the light, strobing the light, following patterns of brightening or darkening, altering colors and brightness simultaneously, or if configured with multiple light sources modulating their colors and brightness in or out of sync with each other.

Some embodiments of the information totem 102 may utilize other notification means utilizing the indicator 106 such as comprising one or more sound broadcasting components, which may be configured to play a single sound, multiple sounds, or broadcast pre-recorded or live messages from a person. Such versions of the information totem 102 may be able to amplify a broadcaster so that, for example, the owner of a space can provide information regarding the space. In some embodiments, the sound device of the indicator 106 may be configured to play sounds or messages designed to encourage people to approach or move away from a specific information totem 102. The information totem 102 may also be configured to emit certain smells in some cases, as an additional means of discouraging persons from standing near them. Some embodiments of the information totem 102 may have additional indicator mechanisms. For example, some may have additional light sources which may be configured in various ways to provide visual information.

Various embodiments of the invention may vary the form the information totem 102 takes, with some embodiments requiring a tall standing structure that is greater in height than the average or even a tall human, potentially reaching twenty feet or higher, while other varieties may be shorter to fit more confined spaces. In some embodiments, the information totem 102 may be mounted or removably mounted on a wall or ceiling instead of being positioned on the ground, and in such embodiments they may be shorter or taller depending on aesthetic and other considerations. In some embodiments the information totems 102 may take different shapes as needed by the space owner or operator. The information totems 102 may be partially mobile, such as being mounted on a track, or may be mounted on a drone or robotic platform capable of moving them.

The information totem 102 can also be configured to also incorporate one or more detection devices inside of it or on its exterior surface, allowing the information totem 102 to further supplement any other detection devices, or the system may rely entirely on detection devices that are located inside of display monitor totem and/or information totems 102.

In some embodiments the information totem 102 is powered either by an internal battery system, plug into a space's existing electrical grid, a solar panel or other passive energy generation system, or a hybrid of the foregoing, but the totem may also be powered by other means depending on the needs of the space and availability of the power source. Power may enter through the information totem 102, base 108, or may be fixed or removably attached inside the housing 104.

The information totems 102 used in any given embodiment of the invention may also not be uniform; the same embodiment may use some information totems 102 that are the totem design, while others may be smaller or larger, take on a different shape, or be located on walls or hanging overhead, and may incorporate the same features as other information totems 102, or may omit certain ones. For example, an implementation of the system may utilize information totems 102 that incorporate detection devices, while a smaller information totem 102 that hangs from a ceiling may not have a detection device incorporated inside of it.

The totems 100 utilized in the system, regardless of implementation or type of totem 100, may be associated in the system with a particular area of a space. For example, if the system is implemented in an airport, each totem may be associated with the gate it is located near. Similarly, if the system is implemented in an event arena, it may be associated with specific blocks of seats or certain concourse areas. If the system is implemented in a museum, each totem 100 may be associated with certain galleries they are located in. In some embodiments, multiple totems 100 may be located in an area of a space, and they may be independently associated, or treated as a single unit for information purposes.

Figure 2A:
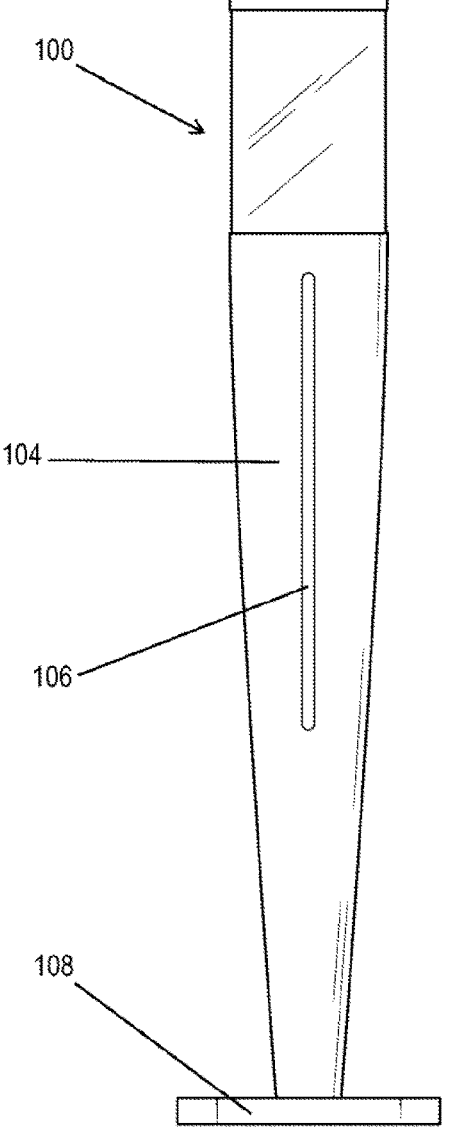
FIGS. 2A and 2B depict front and side views respectively of an information totem device in accordance with an embodiment of the invention.
Figure 2B:
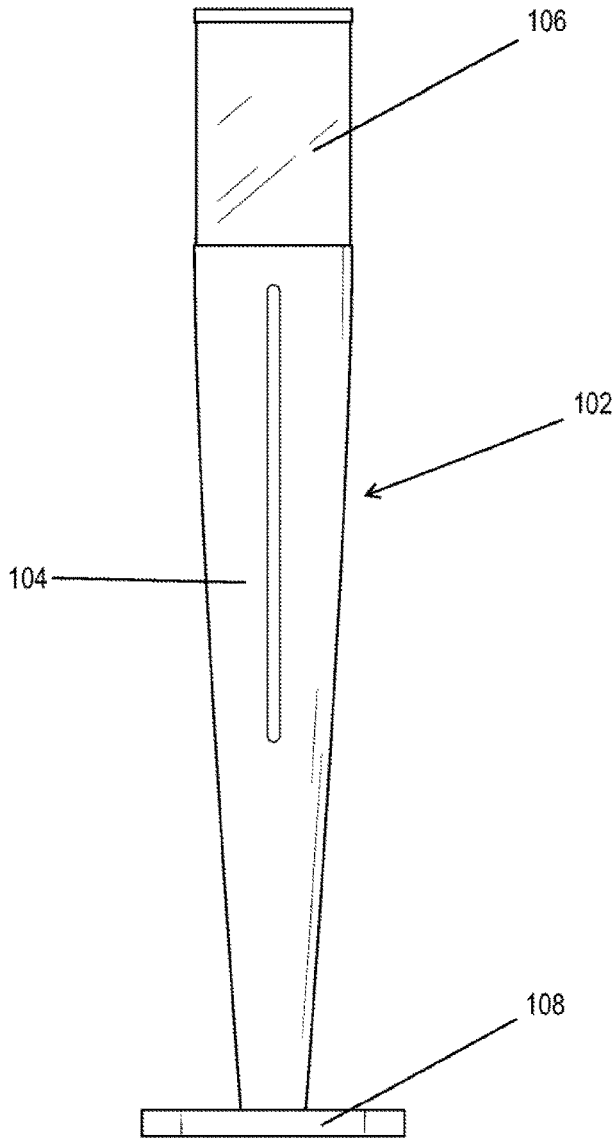

FIGS. 2A and 2B depict front and side views respectively of an example of an information totem device 102 configured with one or more indicators 106 as an embodiment of the invention that can be utilized by the system in order to provide contextual information to persons within a space.

The system is comprised of one or more varieties of totem 100, including an information totem 102, may have a housing 104, one or more indicators 106, and a base 108. The totem 100, including the information totem 102 can be configured in a number of ways depending on the needs of the implementation of the system.

In some embodiments, an informational totem 102 is comprised of a totem 100 that is removably affixed to the ground, is relatively narrow and thin, is approximately six to eight feet tall, and has an indicator positioned near the top of the totem 102.

In some embodiments, the information totem 102 is configured with an indicator 106 that may be a light source that is capable of displaying one or more different colors of light. The indicator 106 light source may be capable of emitting colors of light such as, but not limited to, red, yellow, green, or blue. The light source may be comprised of a light emitting diode or conventional filament light bulb, or may be comprised of a pixel-based screen component. Other embodiments of the invention may have information totems 102 that utilize yet undeveloped light source components. In some embodiments, the indicator 106 light source may be capable of changing how it emits light, such as, but not limited to: brightening or darkening the light, strobing the light, following patterns of brightening or darkening, altering colors and brightness simultaneously, or if configured with multiple light sources modulating their colors and brightness in or out of sync with each other.

Some embodiments of the information totem 102 may utilize other notification means utilizing the indicator 106 such as comprising one or more sound broadcasting components, which may be configured to play a single sound, multiple sounds, or broadcast pre-recorded or live messages from a person. Such versions of the information totem 102 may be able to amplify a broadcaster so that, for example, the owner of a space can provide information regarding the space. In some embodiments, the sound device of the indicator 106 may be configured to play sounds or messages designed to encourage people to approach or move away from a specific information totem 102. The information totem 102 may also be configured to emit certain smells in some cases, as an additional means of discouraging persons from standing near them. Some embodiments of the information totem 102 may have additional indicator mechanisms. For example, some may have additional light sources which may be configured in various ways to provide visual information.

Various embodiments of the invention may vary the form the information totem 102 takes, with some embodiments requiring a tall standing structure that is greater in height than the average or even a tall human, potentially reaching twenty feet or higher, while other varieties may be shorter to fit more confined spaces. In some embodiments, the information totem 102 may be mounted or removably mounted on a wall or ceiling instead of being positioned on the ground, and in such embodiments they may be shorter or taller depending on aesthetic and other considerations. In some embodiments the information totems 102 may take different shapes as needed by the space owner or operator. The information totems 102 may be partially mobile, such as being mounted on a track, or may be mounted on a drone or robotic platform capable of moving them.

The information totem 102 can also be configured to also incorporate one or more detection devices inside of it or on its exterior surface, allowing the information totem 102 to further supplement any other detection devices, or the system may rely entirely on detection devices that are located inside of display monitor totem and/or information totems 102.

In some embodiments the information totem 102 is powered either by an internal battery systems, plug into a space's existing electrical grid, a solar panel or other passive energy generation system, or a hybrid of the foregoing, but the totem may also be powered by other means depending on the needs of the space and availability of the power source. Power may enter through the information totem 102, base 108, or may be fixed or removably attached inside the housing 104.

The information totems 102 used in any given embodiment of the invention may also not be uniform; the same embodiment may use some information totems 102 that are the totem design, while others may be smaller or larger, take on a different shape, or be located on walls or hanging overhead, and may incorporate the same features as other information totems 102, or may omit certain ones. For example, an implementation of the system may utilize information totems 102 that incorporate detection devices, while a smaller information totem 102 that hangs from a ceiling may not have a detection device incorporated inside of it.

The totems 100 utilized in the system, regardless of implementation or type of totem 100, may be associated in the system with a particular area of a space. For example, if the system is implemented in an airport, each totem may be associated with the gate it is located near. Similarly, if the system is implemented in an event arena, it may be associated with specific blocks of seats or certain concourse areas. If the system is implemented in a museum, each totem 100 may be associated with certain galleries they are located in. In some embodiments, multiple totems 100 may be located in an area of a space, and they may be independently associated, or treated as a single unit for information purposes.

Figure 3:
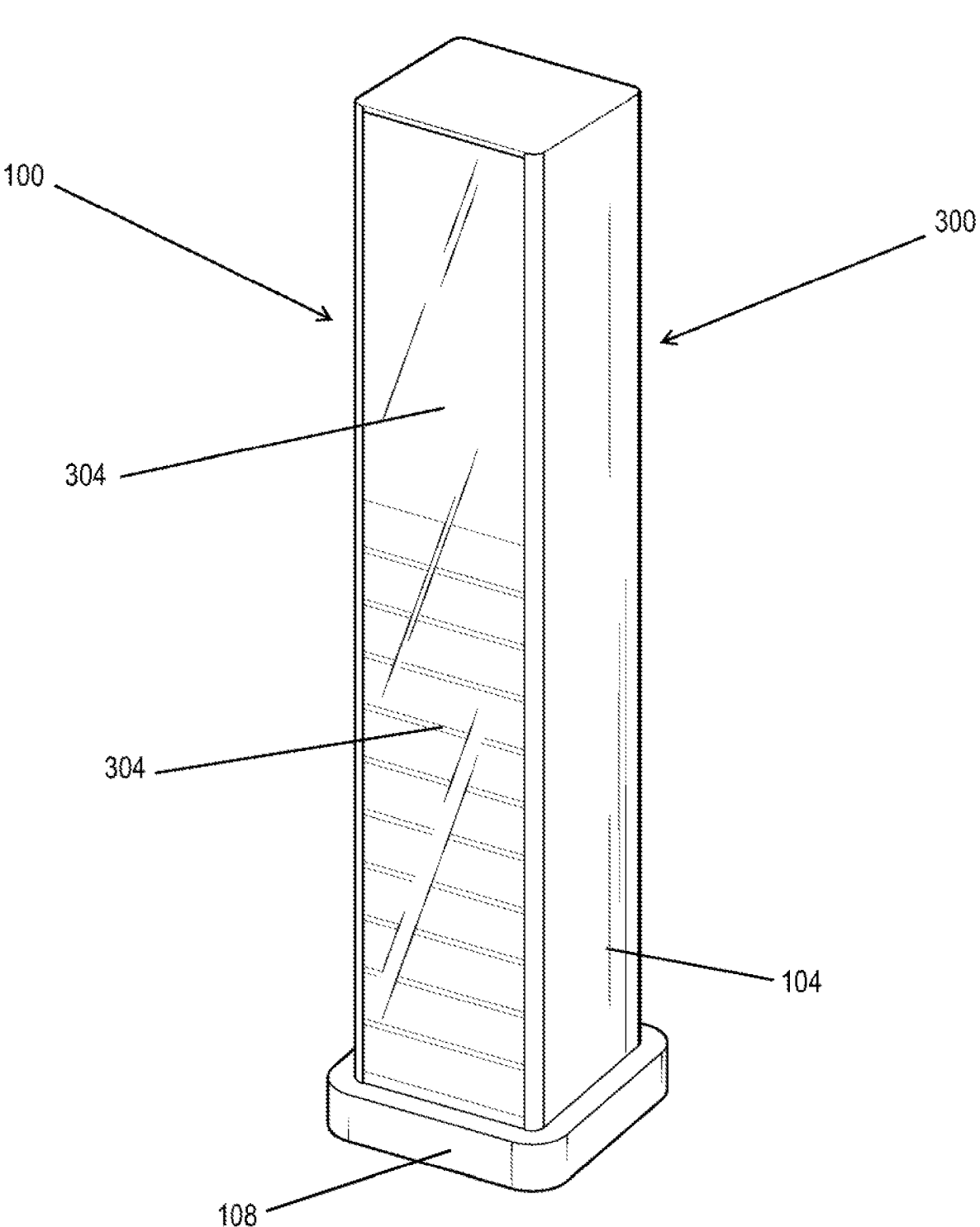
FIG. 3 is a perspective view of a display monitor totem device in accordance with an embodiment of the invention.

FIG. 3 is a perspective view of a display monitor totem 300 configured to display information to persons.

One variety of totem 100 that might be utilized by the present invention is illustrated in FIG. 3 and may be described as a display monitor totem 300. Such embodiments are comprised of a base 108, housing 104, and one or more displays 304 which are configured to be able to display information to a viewer.

In some embodiments, a display monitor totem 300 is a device that is removably affixed to the ground, is wider than it is thin, is approximately six to eight feet tall, and possesses a display screen capable of displaying information in one or more ways.

The display monitor totem 300 may be configured in a variety of ways depending on the needs of the space and the particular system. In some embodiments, the display monitor totem 300 will possess a display 304 comprised of a screen configured to display information. The display 304 may be selected from a variety of options including, but not limited to, a pixel-based view screen, a grid of identical lights that can be individually controlled, a projection based screen wherein images are projected onto a plane, or a variety of other display mechanisms including those yet to be developed.

Some embodiments of the display monitor totem 300 will be configured to passively provide information to persons in a space, such as displaying audiovisual content related to safety or guidance through the space. In some configurations of the system, the display monitor totems 300 will be configured to display up-to-date information regarding the space, such as, but not limited to, information about population densities in certain areas of the space, when certain areas of the space were last cleaned, or routes through the space that have fewer persons in them or avoid large gatherings. For example, if the space were an airport, the display monitor totem 300 may, at the request of a user or unprompted, display low population density routes from the specific display monitor totem to a specific airplane gate, a specific information totem or display monitor totem 300 that has a lower population density around it, or another location with a lower population density. Other examples could involve display monitor totems 300 displaying information about when a certain area of the space was last cleaned based on information gathered by the detection devices and related to a computer system which analyzed the movements of cleaning personnel to determine when a specific area was last cleaned.

In some embodiments, the display monitor totem 300 may additionally be configured with a light source, which may be part of its display 304, that is capable of displaying one or more different colors of light; making it similar to an information totem in function or otherwise able to supplement the function of an information totem. Some embodiments of the invention may not rely on information totems at all and instead utilize entirely display monitor totems 300 or display monitor totems 300 equipped with light sources as their display 304. The light source may be capable of emitting colors of light such as, but not limited to, red, yellow, green, or blue. The light source may be comprised of a light emitting diode or conventional filament light bulb, or may be comprised of a pixel-based screen component. Other embodiments of the invention may have display monitor totem devices 300 that utilize yet undeveloped light source components. In some embodiments, the light source of the display 304 may be capable of changing how it emits light, such as, but not limited to: brightening or darkening the light, strobing the light, following patterns of brightening or darkening, altering colors and brightness simultaneously, or if configured with multiple light sources modulating their colors and brightness in or out of sync with each other.

Some embodiments of the display monitor totem 300 device may utilize other notification means such as comprising one or more sound broadcasting devices, which may be configured to play a single sound, multiple sounds, or broadcast pre-recorded or live messages from a person. Such versions of the display monitor totem 300 may be able to amplify a broadcaster so that, for example, the owner of a space can provide information regarding the space. In some embodiments, the sound device may be configured to play sounds or messages designed to encourage people to approach or move away from a specific display monitor totem device 300.

Various embodiments of the invention may vary the form the display monitor totem 300 takes, with some embodiments requiring a tall standing structure that is greater in height than the average or even a tall human, potentially reaching twenty feet or higher, while other varieties may be shorter to fit more confined spaces. In some embodiments, the display monitor totem 300 may be mounted or removably mounted on a wall or ceiling instead of being positioned on the ground, and in such embodiments they may be shorter or taller depending on aesthetic and other considerations. In some embodiments the display monitor totems 300 may take different shapes as needed by the space operator. The display monitor totems 300 may be partially mobile, such as being mounted on a track, or may be mounted on a drone or robotic platform capable of moving them.

Other embodiments of the display monitor totem 300 may incorporate very wide displays 304 that exceed the width or height of the totem body, or they may utilize unique or unconventional screen shapes or designs, such as curved or asymmetrical displays 304.

The display monitor totem 300 can also be configured to also incorporate one or more detection devices inside of it or on its exterior surface, allowing the display monitor totem 300 to further supplement any other detection devices, or the system may rely entirely on detection devices that are located inside of display monitor totem 300 and/or information totems.

In some embodiments the display monitor totem 300 is powered either by an internal battery system located within the base 108 or housing 104, plug into a space's existing electrical grid, a solar panel or other passive energy generation system, or a hybrid of the foregoing, but the totem 100 may also be powered by other means depending on the needs of the space and availability of the power source.

The display monitor totems 300 used in any given embodiment of the invention may also not be uniform; the same embodiment may use some display monitor totems 300 that are the totem 100 design, while others may be screens located on walls or hanging overhead, which may incorporate the same features as other design monitor totems 300, or may omit certain ones. For example, an implementation of the system may utilize display monitor totems 300 that incorporate detection devices, while a screen-type display monitor totem 300 that hangs from a ceiling may not have a detector incorporated inside of it.

In some embodiments, the display monitor totems 300 may be configured with a control input that can be accessed by persons in the space. Such control input may be comprised of, but is not limited to a keyboard, computer mouse, or touchscreen that allows a person to interact with the display monitor totem 300 which may be incorporated into the display 304, or be independent from the display 304, or be independent from the display 304 and placed on the housing 104. For example, a person may be able to request the display monitor totem 300 show them information about other areas of a space, provide them with a route to another area of the space that meets certain criteria such as avoiding high person density areas, show them information about when areas of the space were last cleaned, or other information the owner or operator of the space has configured the display monitor totem 300 to be able to display. For example, some owners or operators of a space may configure the display monitor totems 300 to display weather or news information, or information regarding safety measures in the space or other protocols that persons in the space should be aware of.

Figures 4A, 4B:
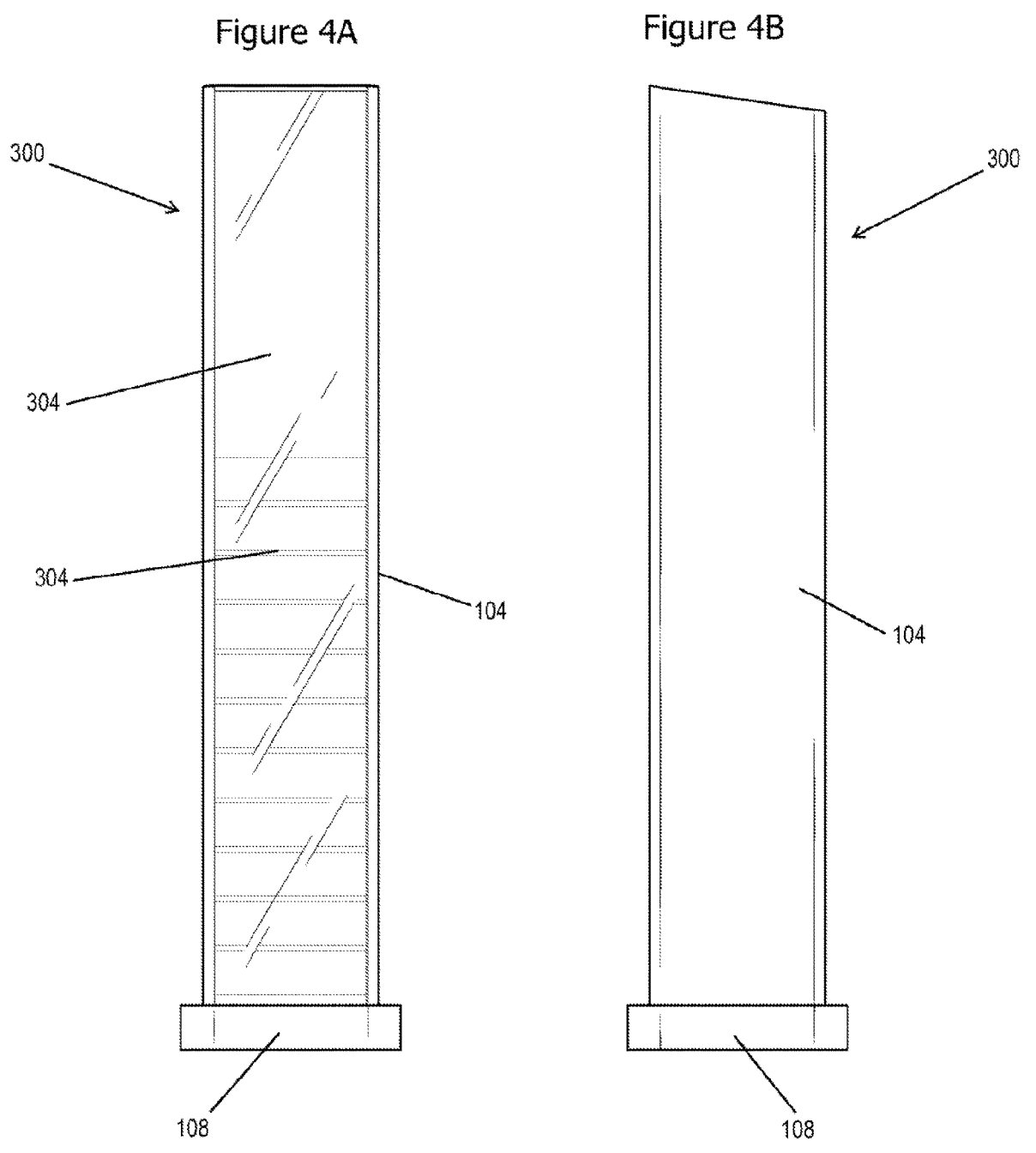

FIGS. 4A and 4B depict front and side views respectively of an example of a display monitor totem 300 capable of displaying information about a space to a person.

One variety of totem that might be utilized by the present invention is embodied in FIG. 4 and may be described as a display monitor totem 300 or a display totem. Such embodiments are comprised of a base 108 and a display monitor 304 which is configured to be able to display information to a viewer.

In some embodiments, a display monitor totem 300 is a device that is removably affixed to the ground, is wider than it is thin, is approximately six to eight feet tall, and possesses a display screen capable of displaying information in one or more ways.

The display monitor totem 300 may be configured in a variety of ways depending on the needs of the space and the particular system. In some embodiments, the display monitor totem 300 will possess a display 304 comprised of a screen configured to display information. The display 304 may be selected from a variety of options including, but not limited to, a pixel-based view screen, a grid of identical lights that can be individually controlled, a projection based screen wherein images are projected onto a plane, or a variety of other display mechanisms including those yet to be developed.

Some embodiments of the display monitor totem 300 will be configured to passively provide information to persons in a space, such as displaying audiovisual content related to safety or guidance through the space. In some configurations of the system, the display monitor totems 300 will be configured to display up-to-date information regarding the space, such as, but not limited to, information about population densities in certain areas of the space, when certain areas of the space were last cleaned, or routes through the space that have fewer persons in them or avoid large gatherings. For example, if the space were an airport, the display monitor totem 300 may, at the request of a user or unprompted, display low population density routes from the specific display monitor totem to a specific airplane gate, a specific information totem or display monitor totem 300 that has a lower population density around it, or another location with a lower population density. Other examples could involve display monitor totems 300 displaying information about when a certain area of the space was last cleaned based on information gathered by the detection devices and related to a computer system which analyzed the movements of cleaning personnel to determine when a specific area was last cleaned.

In some embodiments, the display monitor totem 300 may additionally be configured with a light source, which may be part of its display 304, that is capable of displaying one or more different colors of light; making it similar to an information totem in function or otherwise able to supplement the function of an information totem. Some embodiments of the invention may not rely on information totems at all and instead utilize entirely display monitor totems 300 or display monitor totems 300 equipped with light sources as their display 304. The light source may be capable of emitting colors of light such as, but not limited to, red, yellow, green, or blue. The light source may be comprised of a light emitting diode or conventional filament light bulb, or may be comprised of a pixel-based screen component. Other embodiments of the invention may have display monitor totem devices 300 that utilize yet undeveloped light source components. In some embodiments, the light source of the display 304 may be capable of changing how it emits light, such as, but not limited to: brightening or darkening the light, strobing the light, following patterns of brightening or darkening, altering colors and brightness simultaneously, or if configured with multiple light sources modulating their colors and brightness in or out of sync with each other.

Some embodiments of the display monitor totem 300 device may utilize other notification means such as comprising one or more sound broadcasting devices, which may be configured to play a single sound, multiple sounds, or broadcast pre-recorded or live messages from a person. Such versions of the display monitor totem 300 may be able to amplify a broadcaster so that, for example, the owner of a space can provide information regarding the space. In some embodiments, the sound device may be configured to play sounds or messages designed to encourage people to approach or move away from a specific display monitor totem device 300.

Various embodiments of the invention vary the form the display monitor totem 300 takes, with some embodiments requiring a tall standing structure that is greater in height than the average or even a tall human, potentially reaching twenty feet or higher, while other varieties may be shorter to tit more confined spaces. In some embodiments, the display monitor totem 300 may be mounted or removably mounted on a wall or ceiling instead of being positioned on the ground, and in such embodiments they may be shorter or taller depending on aesthetic and other considerations. In some embodiments the display monitor totems 300 may take different shapes as needed by the space operator. The display monitor totems 300 may be partially mobile, such as being mounted on a track, or may be mounted on a drone or robotic platform capable of moving them.

Other embodiments of the display monitor totem 300 may incorporate very wide displays 304 that exceed the width or height of the totem body, or they may utilize unique or unconventional screen shapes or designs, such as curved or asymmetrical displays 304.

The display monitor totem 300 can also be configured to also incorporate one or more detection devices inside of it or on its exterior surface, allowing the display monitor totem 300 to further supplement any other detection devices, or the system may rely entirely on detection devices that are located inside of display monitor totem 300 and/or information totems.

In some embodiments the display monitor totem 300 is powered either by an internal battery system located within the base 108 or housing 104, plug into a space's existing electrical grid, a solar panel or other passive energy generation system, or a hybrid of the foregoing, but the totem 100 may also be powered by other means depending on the needs of the space and availability of the power source.

The display monitor totems 300 used in any given embodiment of the invention may also not be uniform; the same embodiment may use some display monitor totems 300 that are the totem 100 design, while others may be screens located on walls or hanging overhead, which may incorporate the same features as other design monitor totems 300, or may omit certain ones. For example, an implementation of the system may utilize display monitor totems 300 that incorporate detection devices, while a screen-type display monitor totem 300 that hangs from a ceiling may not have a detector incorporated inside of it.

In some embodiments, the display monitor totems 300 may have configured with a control input that can be accessed by persons in the space. Such control input may be comprised of, but is not limited to a keyboard, computer mouse, or touchscreen that allows a person to interact with the display monitor totem 300 which may be incorporated into the display 304, or be independent from the display 304 and placed on the housing 104. For example, a person may be able to request the display monitor totem 300 show them information about other areas of a space, provide them with a route to another area of the space that meets certain criteria such as avoiding high person density areas, show them information about when areas of the space were last cleaned, or other information the owner or operator of the space has configured the display monitor totem 300 to be able to display. For example, some owners or operators of a space may configure the display monitor totems 300 to display weather or news information, or information regarding safety measures in the space or other protocols that persons in the space should be aware of.

Figure 5:
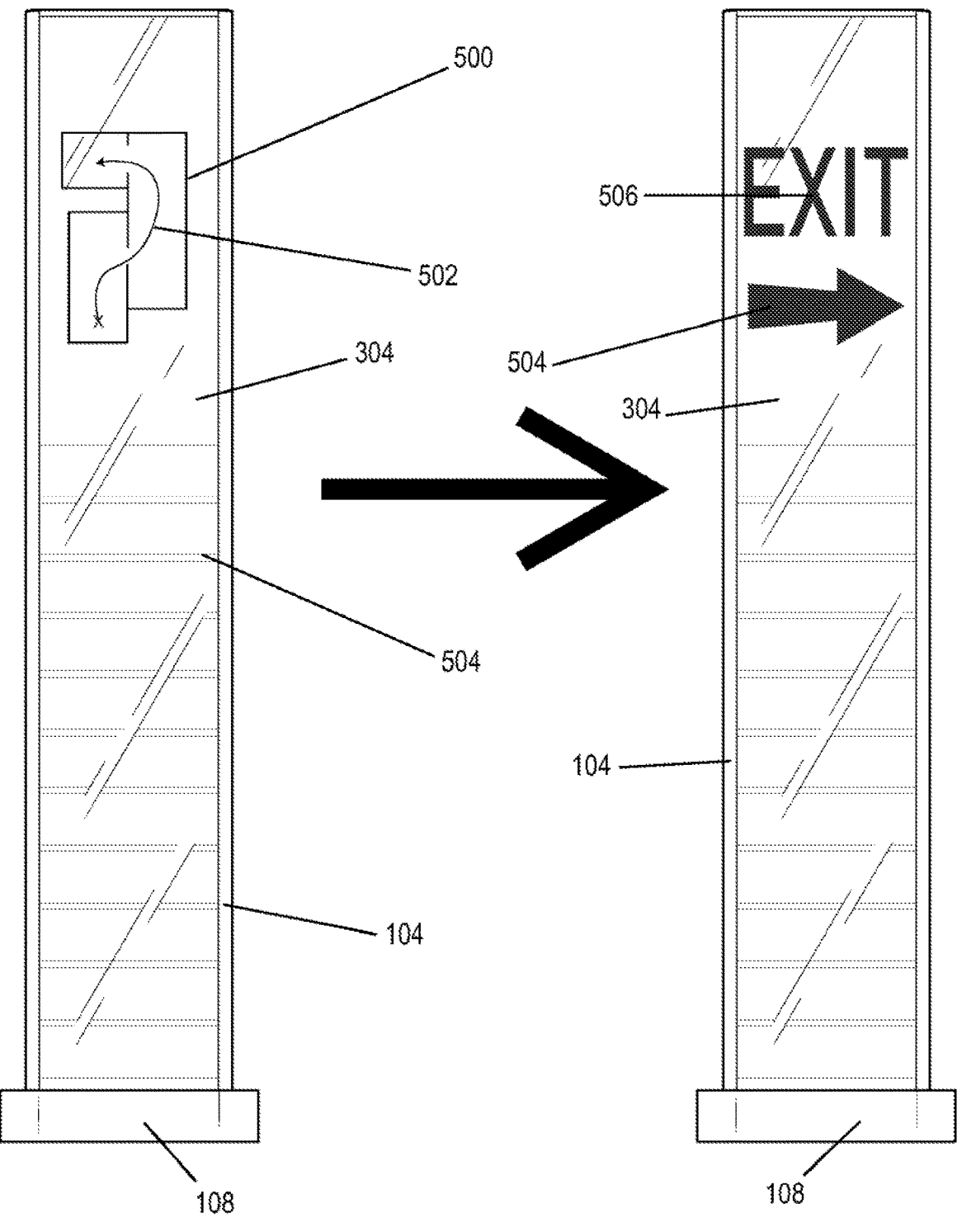
FIG. 5 is a front view of a display monitor demonstrating it altering its message based on information provided by the computer processor in accordance with an embodiment of the invention.

FIG. 5 is a front view of a display monitor totem 300 demonstrating it altering its message based on information provided by the computer processor.

One variety of totem that might be utilized by the present invention is embodied in FIG. 5 and may be described as a display monitor totem 300 or a display totem. Such embodiments are comprised of a base 108 and a display monitor 304 which is configured to be able to display information to a viewer. As demonstrated in FIG. 5, the display monitor 304 may display different information, and that information may change in response to input by the computer system with which it is associated. In some embodiments, the display monitor 304 may show a map 500 with a path 502 to a location of a user's choice, or may indicate a direction 504 to a location 506 as shown. In some embodiments, this message may be varied over time, repeated periodically, or respond to the needs of the owner or operator of the space.

In some embodiments, a display monitor totem 300 is a device that is removably affixed to the ground, is wider than it is thin, is approximately six to eight feet tall, and possesses a display screen capable of displaying information in one or more ways.

The display monitor totem 300 may be configured in a variety of ways depending on the needs of the space and the particular system. In some embodiments, the display monitor totem 300 will possess a display 304 comprised of a screen configured to display information. The display 304 may be selected from a variety of options including, but not limited to, a pixel-based view screen a grid of identical lights that can be individually controlled, a projection based screen wherein images are projected onto a plane, or a variety of other display mechanisms including those yet to be developed.

Some embodiments of the display monitor totem 300 will be configured to passively provide information to persons in a space, such as displaying audiovisual content related to safety or guidance through the space. In some configurations of the system, the display monitor totems 300 will be configured to display up-to-date information regarding the space, such as, but not limited to, information about population densities in certain areas of the space, when certain areas of the space were last cleaned, or routes through the space that have fewer persons in them or avoid large gatherings. For example, if the space were an airport, the display monitor totem 300 may, at the request of a user or unprompted, display low population density routes from the specific display monitor totem to a specific airplane gate, a specific information totem or display monitor totem 300 that has a lower population density around it, or another location with a lower population density. Other examples could involve display monitor totems 300 displaying information about when a certain area of the space was last cleaned based on information gathered by the detection devices and related to a computer system which analyzed the movements of cleaning personnel to determine when a specific area was last cleaned.

In some embodiments, the display monitor totem 300 may additionally be configured with a light source, which may be part of its display 304, that is capable of displaying one or more different colors of light; making it similar to an information totem in function or otherwise able to supplement the function of an information totem. Some embodiments of the invention may not rely on information totems at all and instead utilize entirely display monitor totems 300 or display monitor totems 300 equipped with light sources as their display 304. The light source may be capable of emitting colors of light such as, but not limited to, red, yellow, green, or blue. The light source may be comprised of a light emitting diode or conventional filament light bulb, or may be comprised of a pixel-based screen component. Other embodiments of the invention may have display monitor totem devices 300 that utilize yet undeveloped light source components. In some embodiments, the light source of the display 304 may be capable of changing how it emits light, such as, but not limited to: brightening or darkening the light, strobing the light, following patterns of brightening or darkening, altering colors and brightness simultaneously, or if configured with multiple light sources modulating their colors and brightness in or out of sync with each other.

Some embodiments of the display monitor totem 300 device may utilize other notification means such as comprising one or more sound broadcasting devices, which may be configured to play a single sound, multiple sounds, or broadcast pre-recorded or live messages from a person. Such versions of the display monitor totem 300 may be able to amplify a broadcaster so that, for example, the owner of a space can provide information regarding the space. In some embodiments, the sound device may be configured to play sounds or messages designed to encourage people to approach or move away from a specific display monitor totem device 300.

Various embodiments of the invention may vary the form the display monitor totem 300 takes, with some embodiments requiring a tall standing structure that is greater in height than the average or even a tall human, potentially reaching twenty feet or higher, while other varieties may be shorter to fit more confined spaces. In some embodiments, the display monitor totem 300 may be mounted or removably mounted on a wall or ceiling instead of being positioned on the ground, and in such embodiments they may be shorter or taller depending on aesthetic and other considerations. In some embodiments the display monitor totems 300 may take different shapes as needed by the space operator. The display monitor totems 300 may be partially mobile, such as being mounted on a track, or may be mounted on a drone or robotic platform capable of moving them.

Other embodiments of the display monitor totem 300 may incorporate very wide displays 304 that exceed the width or height of the totem body, or they may utilize unique or unconventional screen shapes or designs, such as curved or asymmetrical displays 304.

The display monitor totem 300 can also be configured to also incorporate one or more detection devices inside of it or on its exterior surface, allowing the display monitor totem 300 to further supplement any other detection devices, or the system may rely entirely on detection devices that are located inside of display monitor totem 300 and/or information totems.

In some embodiments the display monitor totem 300 is powered either by an internal battery system located within the base 108 or housing 104, plug into a space's existing electrical grid, a solar panel or other passive energy generation system, or a hybrid of the foregoing, but the totem 100 may also be powered by other means depending on the needs of the space and availability of the power source.

The display monitor totems 300 used in any given embodiment of the invention may also not be uniform; the same embodiment may use some display monitor totems 300 that are the totem 100 design, while others may be screens located on walls or hanging overhead, which may incorporate the same features as other design monitor totems 300, or may omit certain ones. For example, an implementation of the system may utilize display monitor totems 300 that incorporate detection devices, while a screen-type display monitor totem 300 that hangs from a ceiling may not have a detector incorporated inside of it.

In some embodiments, the display monitor totems 300 may have configured with a control input that can be accessed by persons in the space. Such control input may be comprised of, but is not limited to a keyboard, computer mouse, or touchscreen that allows a person to interact with the display monitor totem 300 which may be incorporated into the display 304, or be independent from the display 304 and placed on the housing 104. For example, a person may be able to request the display monitor totem 300 show them information about other areas of a space, provide them with a map 500 showing a route to another area of the space 502 that meets certain criteria such as avoiding high person density areas, show them information about when areas of the space were last cleaned, or other information the owner or operator of the space has configured the display monitor totem 300 to be able to display. For example, some owners or operators of a space may configure the display monitor totems 300 to display weather or news information, or information regarding safety measures in the space or other protocols that persons in the space should be aware of. Alternatively, the display monitor totem 300 may be utilized to indicate a direction 504 to a specific location 506 such as an exit or restroom.

Figure 6:
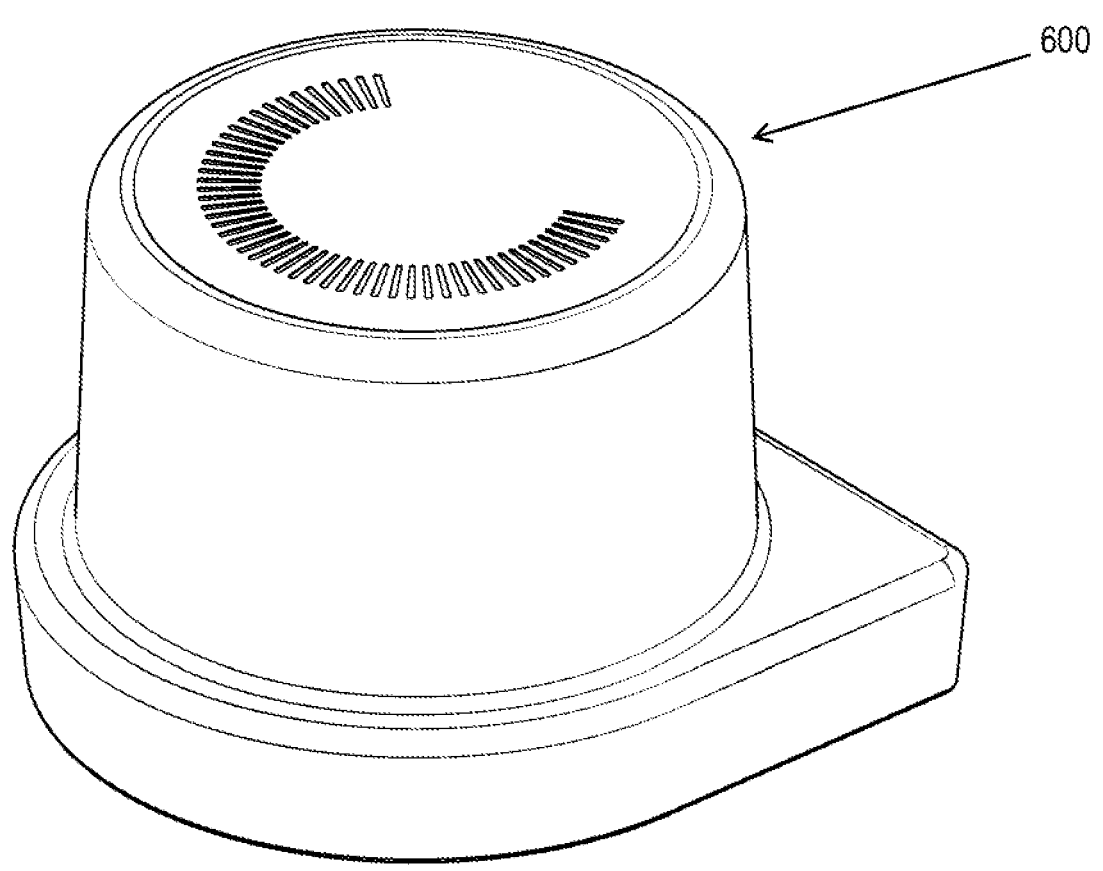
FIG. 6 is a perspective view of a detection device utilized by the system in accordance with an embodiment of the invention.

FIG. 6 is a perspective view of a detection device 600 utilized by the system in accordance with an embodiment with the invention.

The invention can be configured to utilize a variety of detection devices 600; including, but not limited to, thermal images, image recognition-based, LiDAR, RADAR, and other forms of active or passive detection of persons. Some embodiments of the invention will use multiple detection mechanisms and rely on multiple types of sensors in order to make a determination about person density or other factors.

Certain embodiments of the invention may incorporate a single detection device 600, while others may incorporate large numbers of them and utilize multiple varieties at once. The exact placement of the detection devices 600 is determined by the space that the operator wishes to monitor and can vary based on the types of detection devices 600 being used. In some embodiments, the detection devices 600 may be integrated into information totems and/or display monitor totems to consolidate power usage or if it is deemed better suited for the space in question.

The detection devices 600 can come in a variety of shapes and configurations, with some being a square inch in size, while others may be nine square feet or greater, depending on the type of detection device 600 being utilized. These detection devices 600 may be mounted on the ground, walls, or ceiling, and in some cases may be permanently fixed to their location or may be removably coupled thereto. In some circumstances an owner or operator of a space may utilize detection devices 600 that are coupled to a drone or other robotic device, or to a track or other means of moving the detection device 600 throughout a space. The detection devices 600 may be positioned in any location or affixed to components of a space such as decorations. The detection devices 600 may also be powered by an internal or external source, or combination of the two.

Some embodiments of the invention will allow for detection devices 600 that are configured not only to detect persons in the space, but may also be able to detect and identify other forms of object, and/or may be able to map the space itself. In such circumstances, the detection devices 600 may be able to provide the system with more detailed information about what is happening in the space beyond the population density, might may also be able to identify the activities persons are engaging in with respect to a section of a space, or may be able to identify other hazards resulting from the presence of certain objects in a space.

Some detection devices 600 may produce enough detailed information that specific persons can be identified. For example, some detection devices 600 may be able to observe the gait and height of individuals, thus becoming able to identify specific individuals based on those characteristics, while other detection devices 600 may recognize the faces of persons within the area. When the system is configured with such devices, it can utilize the information and display monitor totems to potentially provide additional information to persons in the space. For example, if a child were separated from his or her patents in a space and the parents sought operator or owner personnel for assistance, the detection devices 600 may be able to identify the child's face, height, gait, or other characteristics to determine which person in the space is the child, and the information and/or display monitor totems can provide information to the parents of the child to assist them in locating the child. If the child were to have left the space, the detection devices 600 may have observed it occur, and thus the system may be able to inform the parents of which exit the child utilized. In other cases, the system may use the characteristics to recognize specific persons, such as operator personnel, in the space, and thus the system can review when they move through the space and what they do in that space. An example of how this might occur is if a security officer is patrolling the space, the detection devices 600 may observe as the officer patrols, and can inform the space operator or owner, the officer's supervisor, or the officer if there are areas that the officer has not patrolled recently or needs more attention.

Depending on the configuration and embodiment, the detection devices 600 may also detect transmitters, such as RFID chips, located on personnel or a space or on persons entering it. In such embodiments, the sensors may also detect persons through other mechanisms, in addition to tracking specific signals.

In some embodiments, the sensor and detection means, one or more detection devices 600, could comprise, but is not limited to, sonar or radar sensors, image recognition from cameras, pressure sensors under floors designed to detect human or similar weights, passive optical "trip" lines or similar inventions, or a combination of the foregoing with the LiDAR or similar systems. The system could also be configured to function with other camera-based systems, or other mechanisms utilized to observe areas and potentially track human movement. The nature of the system would also enable it to function with other yet-to-be-invented means of detection. In one or more embodiments, the system may utilize LiDAR or ultrasonic rangefinders in order to generate a view of the area around the detection device 600. When multiple detection devices 600 are implemented, the computer processor may utilize software to piece together an image of the area monitored by the detection devices 600 by combining the results of their detection.

In one or more embodiments, the system utilizes the data from the detection devices 600 to determine whether objects in an area are persons. In some embodiments, this may be done by recognizing common landmarks of the human body such as arms, the legs, or head and seeing if the detected images match such landmarks. Other implementations may utilize image recognition to attempt to fit the shapes detected by detection devices 600 to known silhouettes of human persons.

Figure 7:
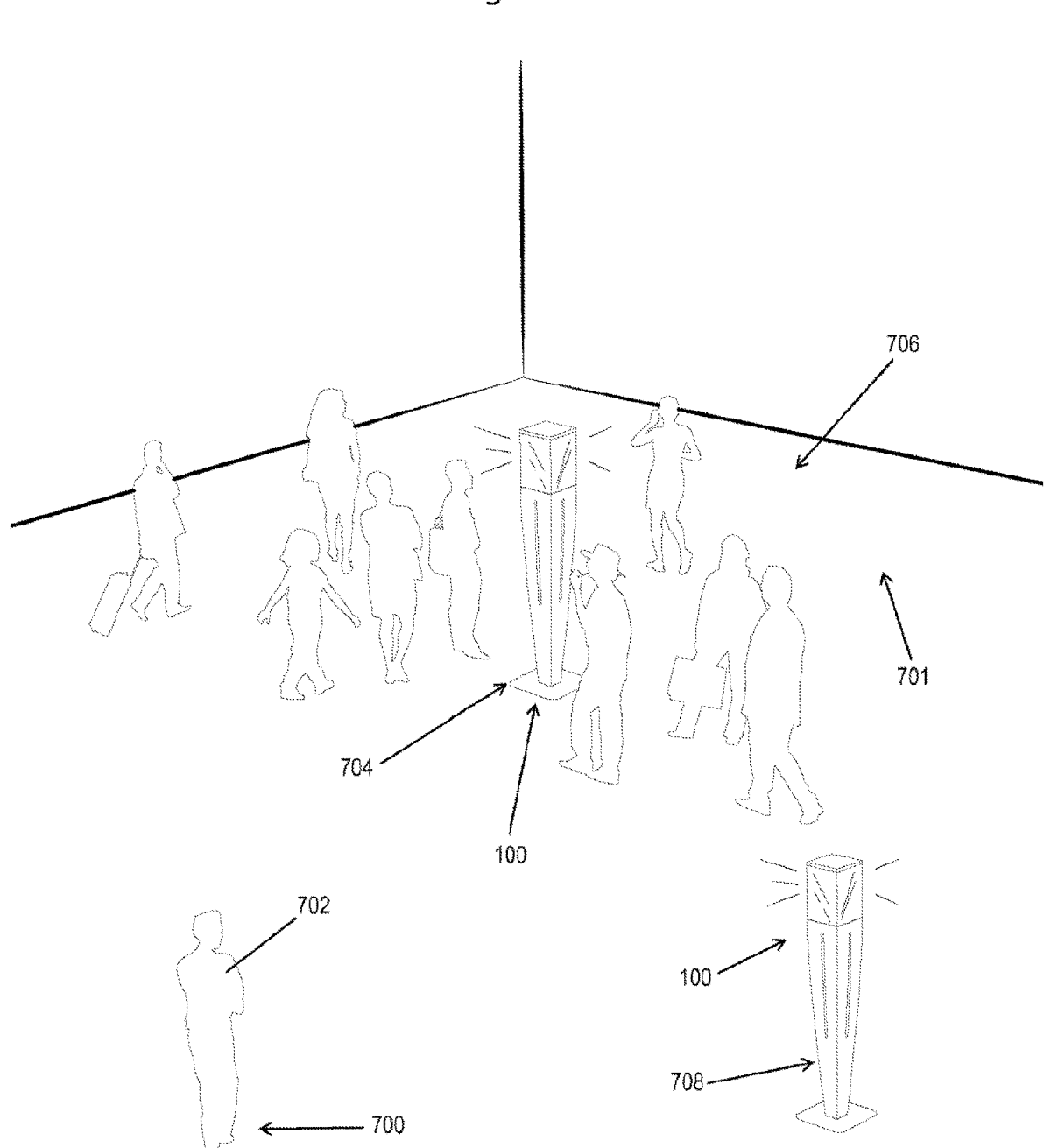
FIG. 7 is a scene depicting an individual attempting to determine a safe place to stand when viewing a pair of information totems in accordance with an embodiment of the invention.

FIG. 7 is a scene depicting an individual attempting to determine a safe place to stand when viewing a pair of totems 100.

When the invention is implemented, there may be multiple totems 100 visible from a given location 700 in the space 701 where a person 702. At the space near a first totem 704 might be a large number of people 706, while the space near a second totem 708 may be few or no people. In such instances, the detection devices 600 may not have detected any individuals in the second totem's 708 area. Thus, the second totem 708 may have been instructed by the system to use its indicator 106 to indicate to the person 702 that the area has a low person density. At the same time, the first totem 704 may be using its indicator 106 to indicate to the people 706 around it that there is a high person density in the area.

In FIG. 7, the person 702 is attempting to determine a place to stand. In such situations, the person 702 may be trying to ensure they can maintain adequate social distancing in the case of a viral pandemic, or they may prefer a quieter location with fewer interruptions.

What constitutes high person density is subjective to the owner or operator of the space and can vary widely. How the system determines person density is also subject to the owner or operator's choice of specific software, algorithm, and/or data that they use to make such determination, and may also be subject to the detection devices 600 being used by the operator or owner. In one or more embodiments, the system may count the number of people 706 visible to a detection devices 600, or may use algorithms to determine the proximity of people 706 to determine whether they are actually close by or whether they are far away from each other. In some embodiments, the system will utilize one or more sets of data from the detection devices 600 and combine them with other sets of data and data related to the layout of the space to make determinations of where there are large numbers of people 706; possibly by counting the number of actual persons detected, or if, for example, the detection devices 60) are not able to provide such specific data, by estimating based on high incidences of detected objects in the space 701. The system may also measure the distance between persons 702 or people 706 detected in the space 701 and combine it with estimations of their physical size to determine how close they are standing to each other. All of this may be done depending on the mechanism the detection devices 600 and computer system are utilizing to make the determinations of whether detected objects are persons. They may be assisted by having data already programmed into them to assist with eliminating objects that are not persons from considerations, such as visual data regarding what chairs or totems look like that the system will ignore, or LIDAR data of the space 701 when it is empty so that the system can compare the current state with the state of the space 701 when it is empty. In some embodiments, the system may observe potential persons 702, using physical landmarks on the human body, silhouette recognition, image recognition, facial recognition, or other features detected by the detection devices 600 depending on their means of detection, combined with algorithms, software and/or machine learning components to determine whether the person 702 is a human being in the space 701 or some other object. In some embodiments, the system may observe the space 701 repeatedly and repeatedly observe persons 702 to make the foregoing determinations and to update its understanding over time. The system can then use data regarding the layout of the space and/or data collected from the detection devices 600 to determine whether the persons 702 it believes to be human beings are in close proximity to each other using a variety of means, such as directly measuring the distance between people 706 and comparing it to the size of the people 706 detected, comparing their locations to known factors about the space 701, and/or generalizing based on known factors such as, but not limited to, the size of a space 701 and the average size of a person. For example, if the system has detected ten people, and the space 701 is known to be one-hundred square feet, the system may conclude that ten people, regardless of exact proximity, in a one-hundred square foot area is too high of person density. The exact factors that lead to such determinations can be made on a case-by-case basis and for each implementation of the system. The system can then observe as people 706 move away from areas being monitored to determine whether the density of people 706 is still too high. The system is not restricted to observing only areas of the space 701 near totems 100, and where totems 100 are not feasible can simply provide data to the operator or owner of the space 701 so that they can, for example, use personnel to request people 706 disperse to other areas.

In some embodiments, the system utilizes detection devices 600 capable of detecting humans, and may or may not be capable of detecting specific human beings. Such sensors are also capable of detecting multiple people 706, even when clustered together, using a detection means such as LiDAR, possibly in combination with thermal or other sensors, and determining how many people 706 are in a specific cluster. Other embodiments may utilize other detection means than LiDAR but with similar effect, such as thermal imaging. In some embodiments, multiple detection devices 600 may be combined to create three dimensional images of an area that the computer system can utilize to make determinations of whether objects detected are humans. The system can do so by utilizing data, software, and/or algorithms programmed to use the data from the LiDAR detection devices 600 to make determinations of which objects the LiDAR detection devices have detected as humans based on a variety of mechanisms, such as, but not limited to, silhouette recognition, image recognition, human body landmark recognition, estimation based on approximate shape, or other means. Where only part of a person is visible to the system, the system may estimate based on such factors, attempt to analyze for edge cases such as a seated person, or utilize other data provided by software or the operator to come to a determination. In some configurations, the system will be configured to be able to recognize persons even in unexpected positions, such as those crouching, sitting, lying down, or other non-standing positions, or even persons who stand in ways that are different from average. Over time, such systems can also be trained by operators, use of machine learning, or artificial intelligence. Where there are potential humans clustered in an area, the system may estimate based on the approximate size of the cluster, may attempt to determine individuals in the cluster, or may attempt to combine such methods, or use other methods known in the art to determine the cluster size.

When multiple information totems 100 and/or display monitor totems are utilized at the same time, they can utilize their indicators, such as light sources, or other mechanisms to indicate to persons 702 who are attempting to find areas of lower population density so that those persons 702 can comply with social distancing guidelines, or if the person 702 simply wishes to locate a quieter or less crowded space.

Some embodiments of the invention may use the totems 100 both as end-points to a path but also as milestones along a path. For example, a person may wish to move to a certain area of a space, and may be instructed to follow information totems that are indicating utilizing a blue light until the person reaches an information totem that is indicating utilizing a red light. The person 702 in such situation can follow the information totems 100 with blue lights until they reach the one with a red light. In such circumstances, display monitor totems may also be used alone or in tandem with information totems 100 to provide this path, or the display monitor totems may provide additional information along the path.

Figure 8:
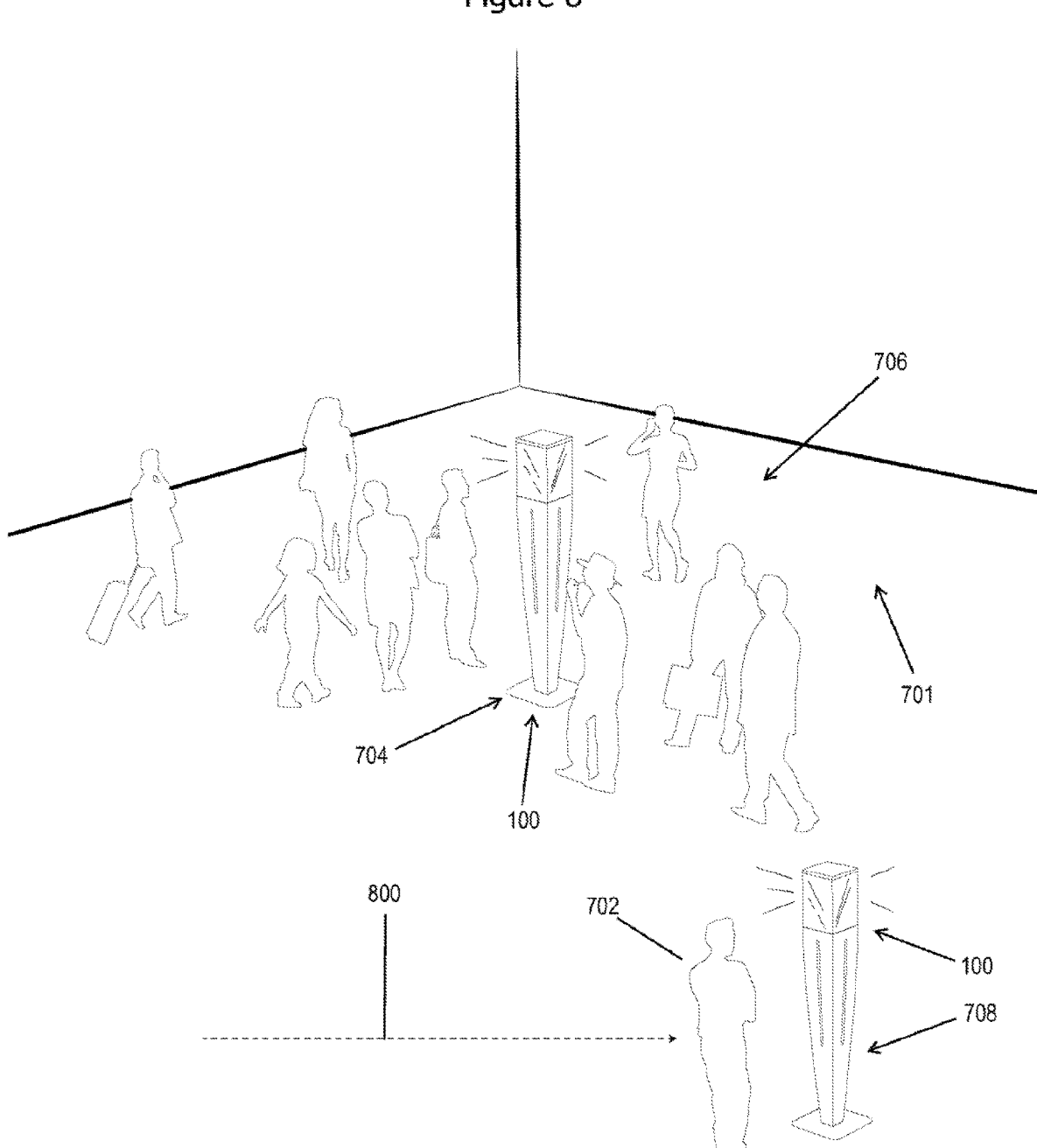
FIG. 8 is a scene depicting an individual who has made a decision about a safe place to stand based on illuminated lights on the information totems in accordance with an embodiment of the invention.

FIG. 8 is a scene depicting a person 702 who has made a decision about a safe place to stand based on illuminated indicators on the information totems. By presenting the information to the individual through a variety of means, the system allows the individual to make certain choices, but through use of certain colors or indicia may encourage certain choices. In FIG. 8, the person 702 indicated in FIG. 7 has chosen to stand near a second totem 708 with a lower population density as a result of that lower population density being indicated by an indicator 106 on the second totem 708, instead of standing near the first totem 704 with a high person density. The person 702 has used a path 800 that avoids the large number of people 706.

In some circumstances the totems 100 may also be configured to provide other indication mechanisms such as sound or even smell in order to further encourage or discourage persons from standing near the totem 100, or as mechanisms for indicating recommendations for where persons 702 visiting the space should stand.

Some embodiments of the invention may have multiple information totems 10) as described herein or as necessary for implementation of the invention. In such cases, the multiple information totems 100 may be configured to utilize different indicia depending on the necessary circumstances. Some may utilize varieties of colored lights to indicate areas of high, medium, low, or other gradations of person density in order to provide guests with effective information and to safely distribute guests of a space. For example, an embodiment may have information totems 100 illuminate a red light indicator when the person density near a space is high, while it may shift to yellow or amber when it is moderate, and green when the person density is low.

The information totems may be of varying heights or configurations, with the result being that the owner or operator of the space wants to ensure adequate visibility to persons in a space. As such, the information totems 100 may be designed to be tall, or may be placed on walls or ceilings in a space. Embodiments may use a variety of totem 100 configurations depending on the needs of the space; if a specific portion of the space lacks open spaces for information totems to be placed, it may be instead placed on a ceiling.

In the case of a person trying to locate a path 800 through a space, the totems 100 can use their indicators to further indicate places that they should avoid. For example, if a first totem 704 is indicating using a red light, the person's path 800 can avoid that totem in favor of the second totem 708 which may have a green light indicated to show that there is not a large number of people 706 near the second totem 708.

What constitutes high person density is subjective to the owner or operator of the space and can vary widely. How the system determines person density is also subject to the owner or operator's choice of specific software, algorithm, and/or data that they use to make such determination, and may also be subject to the detection devices 600 being used by the operator or owner. In one or more embodiments, the system may count the number of people 706 visible to a detection devices 600, or may use algorithms to determine the proximity of people 706 to determine whether they are actually close by or whether they are far away from each other. In some embodiments, the system will utilize one or more sets of data from the detection devices 600 and combine them with other sets of data and data related to the layout of the space to make determinations of where there are large numbers of people 706; possibly by counting the number of actual persons detected, or if, for example, the detection devices 600 are not able to provide such specific data, by estimating based on high incidences of detected objects in the space 701. The system may also measure the distance between persons 702 or people 706 detected in the space 701 and combine it with estimations of their physical size to determine how close they are standing to each other. All of this may be done depending on the mechanism the detection devices 600 and computer system are utilizing to make the determinations of whether detected objects are persons. They may be assisted by having data already programmed into them to assist with eliminating objects that are not persons from considerations, such as visual data regarding what chairs or totems look like that the system will ignore, or LIDAR data of the space 701 when it is empty so that the system can compare the current state with the state of the space 701 when it is empty. In some embodiments, the system may observe potential persons 702, using physical landmarks on the human body, silhouette recognition, image recognition, facial recognition, or other features detected by the detection devices 600 depending on their means of detection, combined with algorithms, software and/or machine learning components to determine whether the person 702 is a human being in the space 701 or some other object. In some embodiments, the system may observe the space 701 repeatedly and repeatedly observe persons 702 to make the foregoing determinations and to update its understanding over time. The system can then use data regarding the layout of the space and/or data collected from the detection devices 600 to determine whether the persons 702 it believes to be human beings are in close proximity to each other using a variety of means, such as directly measuring the distance between people 706 and comparing it to the size of the people 706 detected, comparing their locations to known factors about the space 701, and/or generalizing based on known factors such as, but not limited to, the size of a space 701 and the average size of a person 702. For example, if the system has detected ten people, and the space 701 is known to be one-hundred square feet, the system may conclude that ten people, regardless of exact proximity, in a one-hundred square foot area is too high of person density. The exact factors that lead to such determinations can be made on a case-by-case basis and for each implementation of the system. The system can then observe as people 706 move away from areas being monitored to determine whether the density of people 706 is still too high. The system is not restricted to observing only areas of the space 701 near totems 100, and where totems 100 are not feasible can simply provide data to the operator or owner of the space 701 so that they can, for example, use personnel to request people 706 disperse to other areas.

Figure 9:
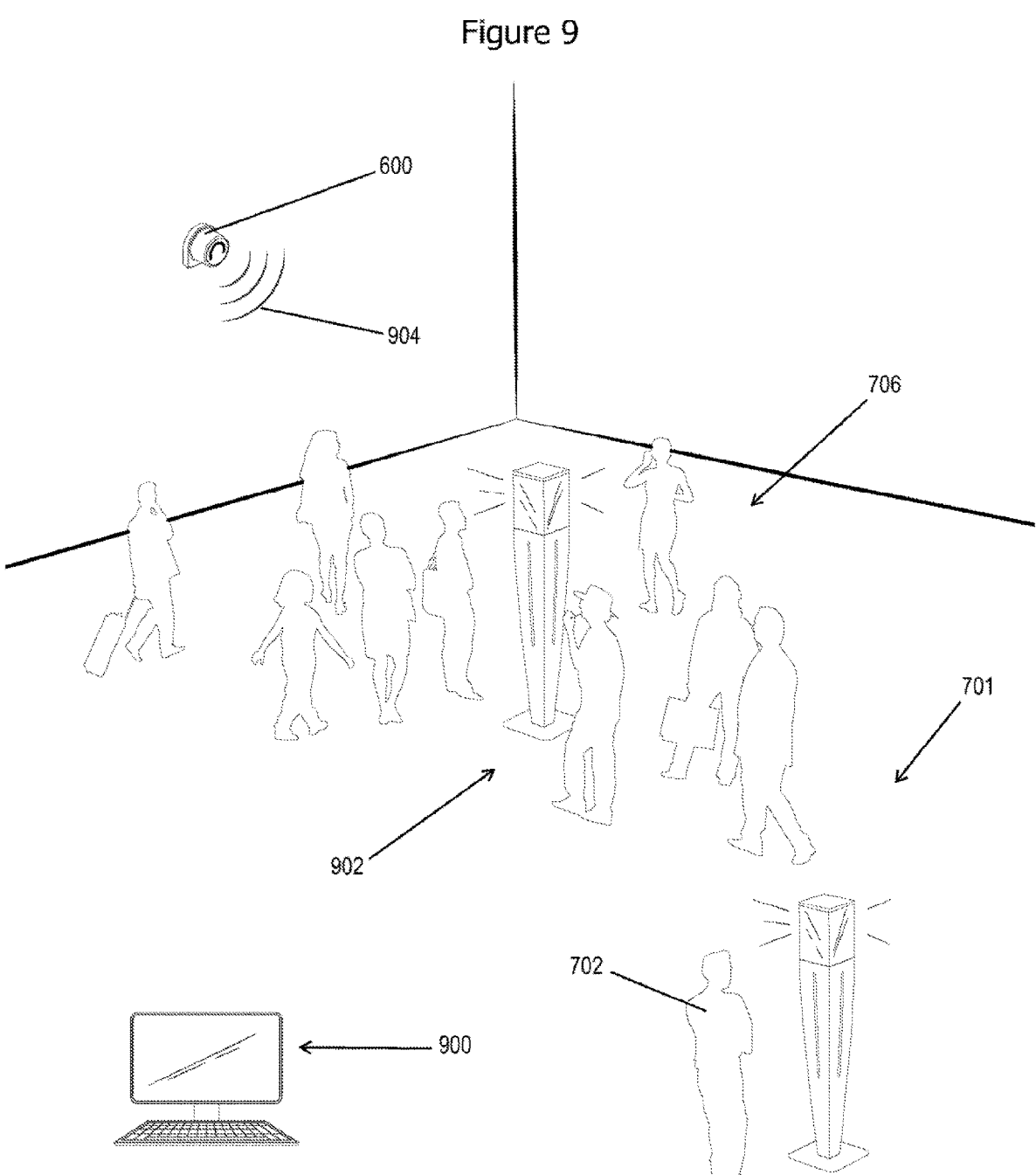
FIG. 9 is a perspective view of the system demonstrating a series of informational totems in a space with persons located near some of the totems, a sensor device tracking the persons' movements, and a computer system recording and analyzing the data in accordance with an embodiment of the invention.

FIG. 9 is a perspective view of the system demonstrating a series of totems 100 in a space 701 with persons 902 located near some of the totems, a detection device 600 tracking the persons' movements, and a computer system 900 recording and analyzing the data provided by the detection device 600.

In some embodiments of the system, the system may be comprised of one or more totems 100, one or more detection devices 600, a computer system 900. Persons 902 in the space 701 may be detected by the one or more detection devices 600 using the detection means 904 they are configured to utilize. In such embodiments, a person 702 may be detected by the detection devices 600 using their detection means 904.

In some circumstances the totems 100 may also be configured to provide other indication mechanisms such as sound or even smell in order to further encourage or discourage persons from standing near the totem 100, or as mechanisms for indicating recommendations for where persons 702 visiting the space 701 should stand.

Some embodiments of the invention may have multiple information totems 100 as described herein or as necessary for implementation of the invention. In such cases, the multiple information totems 100 may be configured to utilize different indicia depending on the necessary circumstances. Some may utilize varieties of colored lights to indicate areas of high, medium, low, or other gradations of person density in order to provide persons 902 with effective information and to safely distribute guests of a space 701. For example, an embodiment may have information totems 100 illuminate a red light indicator when the person density near a totem 100 is high, while it may shift to yellow or amber when it is moderate, and green when the person density is low.

The information totems 100 may be of varying heights or configurations, with the result being that the owner or operator of the space 701 wants to ensure adequate visibility to persons 702 in a space 701. As such, the information totems 100 may be designed to be tall, or may be placed on walls or ceilings in a space 701. Embodiments may use a variety of totem 100 configurations depending on the needs of the space 701; if a specific portion of the space 701 lacks open spaces for information totems 100 to be placed, it may be instead placed on a ceiling.

In some embodiments, the detection means 904 might be light detection and ranging (LIDAR) while in others it may use other mechanisms such as ultrasound emitters, pressure plates on the floor of the space 701, "trip" mechanisms that are triggered by the movements of persons 902 within the space 701, or other mechanisms. The detection means 904 of the detection devices 600 return data to the detection devices 600, which the computer system 900 may then combine into a single image of the space 701 so that the computer system 900 is aware of the person density of persons 902 in the space 701.

What constitutes high person density is subjective to the owner or operator of the space and can vary widely. How the system determines person density is also subject to the owner or operator's choice of specific software, algorithm, and/or data that they use to make such determination, and may also be subject to the detection devices 600 being used by the operator or owner. In one or more embodiments, the system may count the number of people 706 visible to a detection devices 600, or may use algorithms to determine the proximity of people 706 to determine whether they are actually close by or whether they are far away from each other. In some embodiments, the system will utilize one or more sets of data from the detection devices 600 and combine them with other sets of data and data related to the layout of the space to make determinations of where there are large numbers of people 706; possibly by counting the number of actual persons detected, or if, for example, the detection devices 600 are not able to provide such specific data depending on their detection means 904, by estimating based on high incidences of detected objects in the space

701. The system may also measure the distance between persons 702 or people 706 detected in the space 701 and combine it with estimations of their physical size to determine how close they are standing to each other. All of this may be done depending on the mechanism the detection devices 600 and computer system are utilizing to make the determinations of whether detected objects are persons. They may be assisted by having data already programmed into them to assist with eliminating objects that are not persons from considerations, such as visual data regarding what chairs or totems look like that the system will ignore, or LIDAR data of the space 701 when it is empty so that the system can compare the current state with the state of the space 701 when it is empty. In some embodiments, the system may observe potential persons 702, using physical landmarks on the human body, silhouette recognition, image recognition, facial recognition, or other features detected by the detection devices 600 depending on their means of detection, combined with algorithms, software and/or machine learning components to determine whether the person 702 is a human being in the space 701 or some other object. In some embodiments, the system may observe the space 701 repeatedly and repeatedly observe persons 702 to make the foregoing determinations and to update its understanding over time. The system can then use data regarding the layout of the space and/or data collected from the detection devices 600 to determine whether the persons 702 it believes to be human beings are in close proximity to each other using a variety of means, such as directly measuring the distance between people 706 and comparing it to the size of the people 706 detected, comparing their locations to known factors about the space 701, and/or generalizing based on known factors such as, but not limited to, the size of a space 701 and the average size of a person. For example, if the system has detected ten people, and the space 701 is known to be one-hundred square feet, the system may conclude that ten people, regardless of exact proximity, in a one-hundred square foot area is too high of person density. The exact factors that lead to such determinations can be made on a case-by-case basis and for each implementation of the system. The system can then observe as people 706 move away from areas being monitored to determine whether the density of people 706 is still too high. The system is not restricted to observing only areas of the space 701 near totems 100, and where totems 100 are not feasible can simply provide data to the operator or owner of the space 701 so that they can, for example, use personnel to request people 706 disperse to other areas.

In some embodiments, the system utilizes detection devices 600 capable of detecting humans, and may or may not be capable of detecting specific human beings. Such sensors are also capable of detecting multiple people 706, even when clustered together, using a detection means 904 such as LiDAR, possibly in combination with thermal or other sensors, and determining how many people 706 are in a specific cluster. Other embodiments may utilize other detection means 904 than LiDAR but with similar effect, such as thermal imaging. In some embodiments, multiple detection devices 600 may be combined to create three dimensional images of an area that the computer system can utilize to make determinations of whether objects detected are humans. The system can do so by utilizing data, software, and/or algorithms programmed to use the data from the LiDAR detection devices 600 to make determinations of which objects the LiDAR detection devices have detected as humans based on a variety of mechanisms, such as, but not limited to, silhouette recognition, image recognition, human body landmark recognition, estimation based on approximate shape, or other means. Where only part of a person is visible to the system, the system may estimate based on such factors, or other data provided by software or the operator. Over time, such systems can also be trained by operators, use of machine learning, or artificial intelligence. Where there are potential humans clustered in an area, the system may estimate based on the approximate size of the cluster, may attempt to determine individuals in the cluster, or may attempt to combine such methods, or use other methods known in the art to determine the cluster size.

Figure 10:
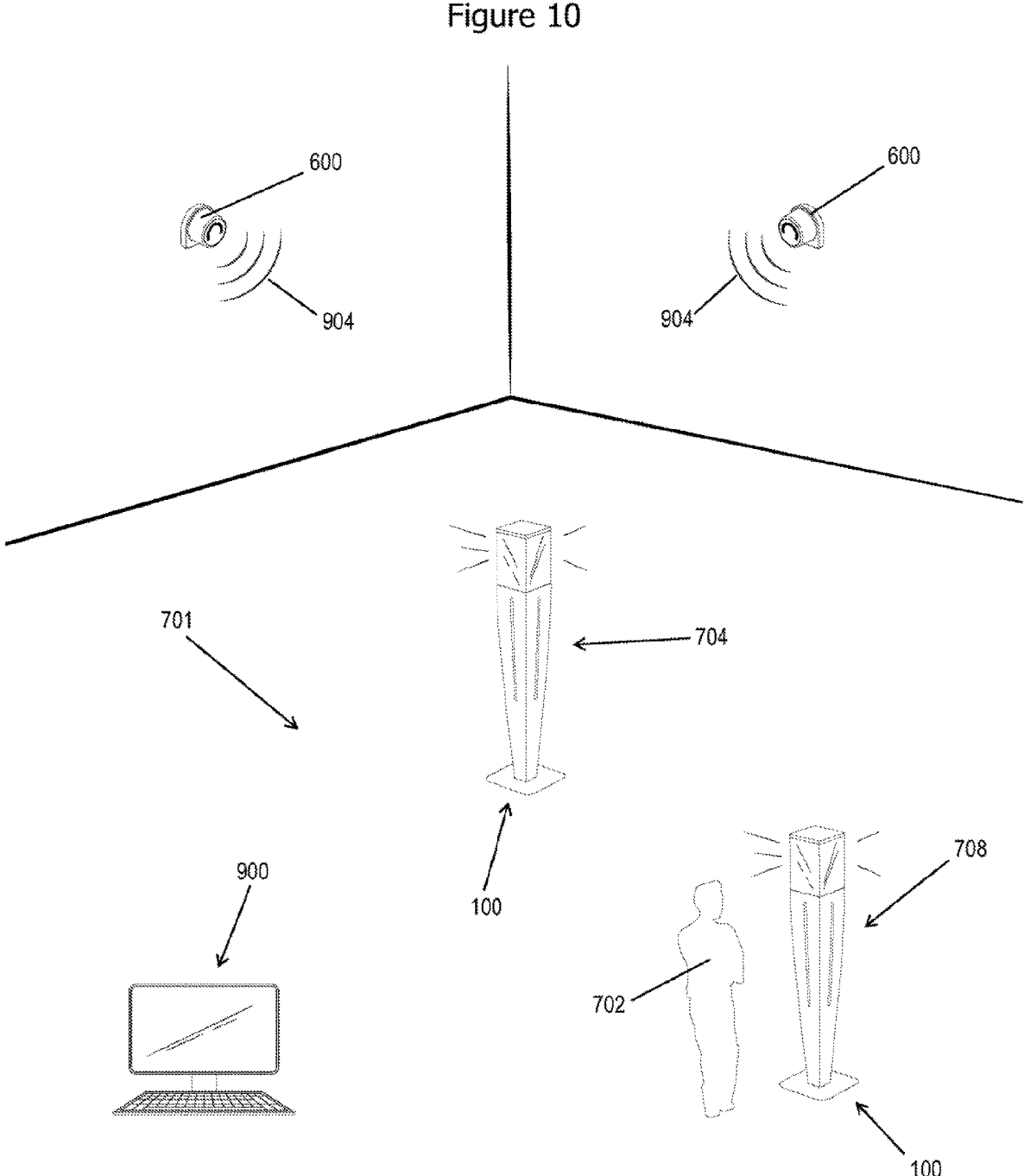
FIG. 10 is a perspective view of the system demonstrating tracking of an individual as they move through a specified area and near certain totems, multiple sensor devices tracking the person in accordance with an embodiment of the invention.

FIG. 10 is a perspective view of the system demonstrating tracking of a person 702 as they move through a specified area and near certain totems, with multiple detection devices 600 tracking the person 702.

In some embodiments of the system, the system may be comprised of one or more information totems 100 including a first totem 704 and a second totem 708, one or more detection devices 600, a computer system 900. Persons 702 in the space 701 may be detected by the one or more detection devices 600 using the detection means 904 they are configured to utilize. In this configuration, the system has detected the person 702 who is standing near the second totem 708, and will continue to track the person 702 as they move through the space 701. In one or more embodiments the tracking of the person 702 is constant, while in others the system may periodically instruct the detection devices 600 to ping using their detection means 904. In some cases, this may be every minute, hour, or some variation thereof depending on the needs of the operator of the space 701. In one or more embodiments, each time the detection device 600 uses its detection means 904 it creates a new image of the space 701, and when there are multiple detection devices 600 they can create a developing three dimensional map of the space 701 that is constantly analyzed by the computer system 900 to determine whether objects in the space 701 are a person 702 using a variety of methods including those known in the art as described herein, and can then determine how the person(s) 702 are moving through the space and know their location based on mapping the space 701 or known data regarding the space 701. Using this data, the system can provide guidance, or make determinations about person 702 density in the space 701, and whether certain people are near known locations of totems 100.

In one or more embodiments, the system may be configured such that the computer system 900 can take data from the detection devices 600 and map the space 701 on its own using data from the detection means 904, while in other embodiments, the system may be configured such that it already has data input regarding the layout of the space 701. Some embodiments of the invention may combine the two approaches, or other mapping approaches, to create active maps of the space 701. For example, the system may have data showing that there are certain objects such as tables and chairs in the space 701, but the active mapping through the detection devices 600 may allow the system to note when those objects have been moved. The system may also be configured to identify such objects when they are detected by the detection devices 600 so that it cannot count them as persons 702. These objects may be detected in the same manner as persons 702 in the space, using image recognition, analyzing data from LIDAR or other mapping, using comparisons of images of objects, machine learning, or other means known in the art or yet developed.

Figure 11:
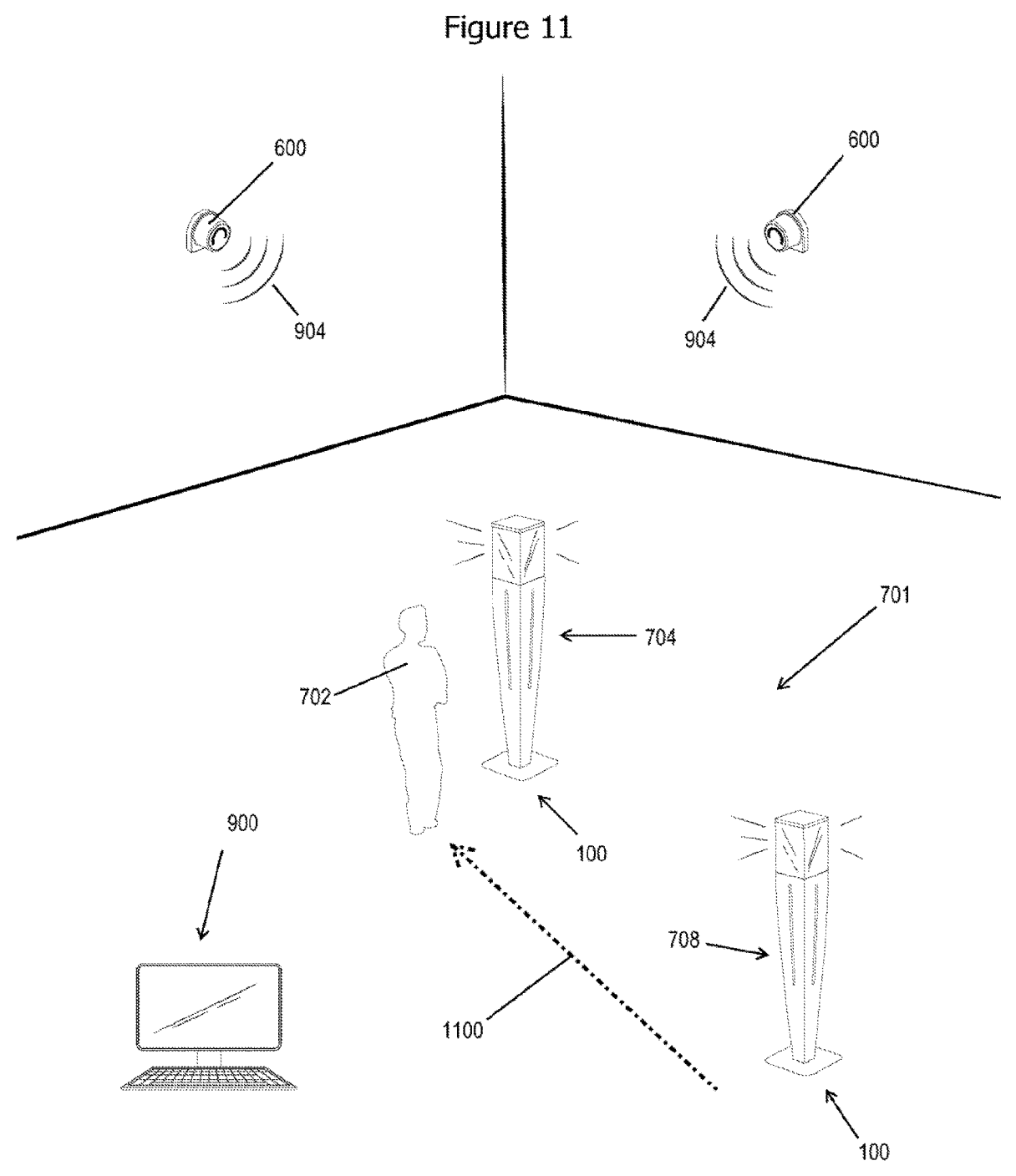

FIG. 11 is a perspective view of the system demonstrating tracking of an individual as they move through a specified area and near certain totems 100, with multiple detection devices 600 tracking the person 702 as they move through the space 701.

In some embodiments of the system, the system may be comprised of one or more information totems 102, one or more detection devices 600, a computer system 900. Persons 702 in the space may be detected by the one or more detection devices 600 using the detection means 904 they utilize.

As shown in FIG. 11, the person(s) 702 in the space may move from a second totem 708 when prompted by indicators on said second totem 708 to move to a first totem 704, or when they are used by display totems or other forms of totem 100. In FIG. 11, the system detection devices 600 are tracking the person 702 as they move from being near the first totem 704 to the second totem 708. In the displayed FIG. 11, the person has moved as indicated by the arrow 1100 from the second totem 708 to the first totem 704.

In some embodiments, the person 702 may be a cleaner or other personnel working for the operator or owner of the space 701, and the person 702 is responsible for cleaning the space 701. In such embodiments, the owner or operator of the space 701 may be able to have the computer system 900 use the detection devices 600 to monitor the person 702 as they move around the space 701, thus also collecting data on whether the duties of the person 702 are being completed. This data could then be broadcast to visitors of the space 701 using the totems 100. If, for example, the person 702 is a cleaner and has cleaned the area near the second totem 708, and is now moving to the first totem 704, the indicators on those totems 100 can be used to indicate the more recent cleaning of the area around the second totem 708. In some embodiments, this indication might be done through a color or sound gradient, or through solid colors or sounds, or periodic sounds.

Similarly, this data can also inform the owner of the space 701 of when the last time the sectors of the space 701 were cleaned by the person 702 if they are operator personnel. In the case where the person 702 is a security guard, the operator of the space 701 could use the data gathered by the computer system 900 to determine what areas of the space 701 are receiving less attention and may thus be more vulnerable to antagonistic elements.

In one or more embodiments, the system may be configured such that the computer system 900 can take data from the detection devices 600 and map the space 701 on its own using data from the detection means 904, while in other embodiments, the system may be configured such that it already has data input regarding the layout of the space 701. Some embodiments of the invention may combine the two approaches, or other mapping approaches, to create active maps of the space 701. For example, the system may have data showing that there are certain objects such as tables and chairs in the space 701, but the active mapping through the detection devices 600 may allow the system to note when those objects have been moved. The system may also be configured to identify such objects when they are detected by the detection devices 600 so that it cannot count them as persons 702. These objects may be detected in the same manner as persons 702 in the space, using image recognition, analyzing data from LIDAR or other mapping, using comparisons of images of objects, machine learning, or other means known in the art or yet developed.

Figure 12:
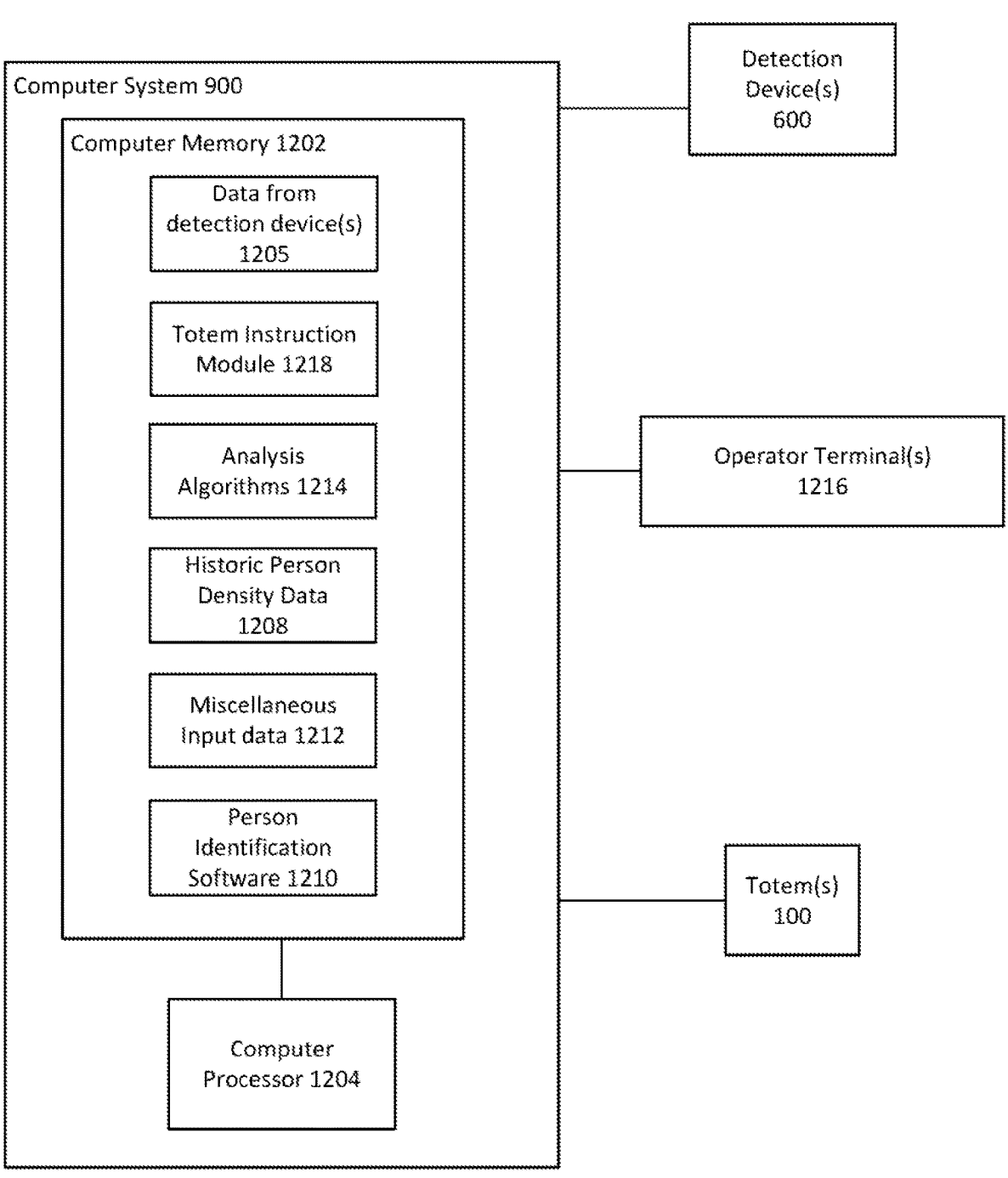
FIG. 12 is a system diagram showing the connections between the computer system, detection devices, and totems in accordance with an embodiment of the invention.

FIG. 12 is a system diagram showing the connections between the computer system, detection devices, and totems.

In some embodiments, the system may be comprised of a computer system 900 which is further comprised of a computer memory 1202 and a computer processor 1204. The computer memory may contain a variety of pieces of information including, but not limited to data received from detection devices 1205, historic person density data 1208, person identification software 1210, and miscellaneous data 1212 that the owner or operator of a space has deemed appropriate for the system to utilize which may include, but is not limited to, data regarding areas where the owner or operator wants to keep person density low, areas that may be under construction and inaccessible, or areas that have not been cleaned recently. The computer memory may also be configured to store data related instructions to the totems as well as analysis algorithms 1214 and other programs configured to analyze data from the detection devices 600. The computer system 900 is then connected to the totems 100 and detection devices 600, as well as any terminals 1216 for the operators or owner of the space.

The computer system 900 may be comprised of a variety of different setups depending on the needs and resources of the space, including, but not limited to, an on-site computer system, an on-site computer network, a remote server with access to the space's network, a cloud service accessed through the space's network, or a hybrid of the foregoing. The computer system 900 is not specific to the network infrastructure it is run upon, and in some embodiments the computer system 900 may be comprised of multiple computers that may or may not be in multiple locations.

In some embodiments, the operator terminals 1216 may be on-site in or near the space being managed, or they may be located off-site and access the computer system 900 through a network or cloud interface. The operator or owner of the space can use the operator terminals 1216 to provide input to the system and allow an operator to input new data, revise the algorithms being run by the system, or manually override the indicators of the totems 100, along with any other administrative functionality that might be necessary to make use of the system. For example, the operator can use the operator terminals 1216 to add emergency information to totems 100 if there is an emergency, or if a specific circumstance has rendered some totems indicator's inaccurate due to a malfunction or other flaw in the system, the operator can use the operator terminal 1216 to manually operate the totems 100 and modify their indicators.

The system may also incorporate a module to instruct the totems, a totem instruction module 1218. Such module may contain software and algorithms configured to instruct the totems on the use of their indicators, such as putting out certain colors or patterns of light, certain types of patterns of sounds, or other indicia.

In some embodiments, the system may be configured with a person identification module, which may be comprised of software, algorithms, or other computational elements configured to take in data from the detection devices and run said computational elements on them to determine if one or more persons have been detected by the detection devices. In some cases, the system may combine data from multiple devices to improve the accuracy of the identification system. The system may utilize software or data such as computer image recognition, analysis of shapes or patterns of movement, data regarding average human builds, historical data, input from operators of the system, or other information.

Figure 13:
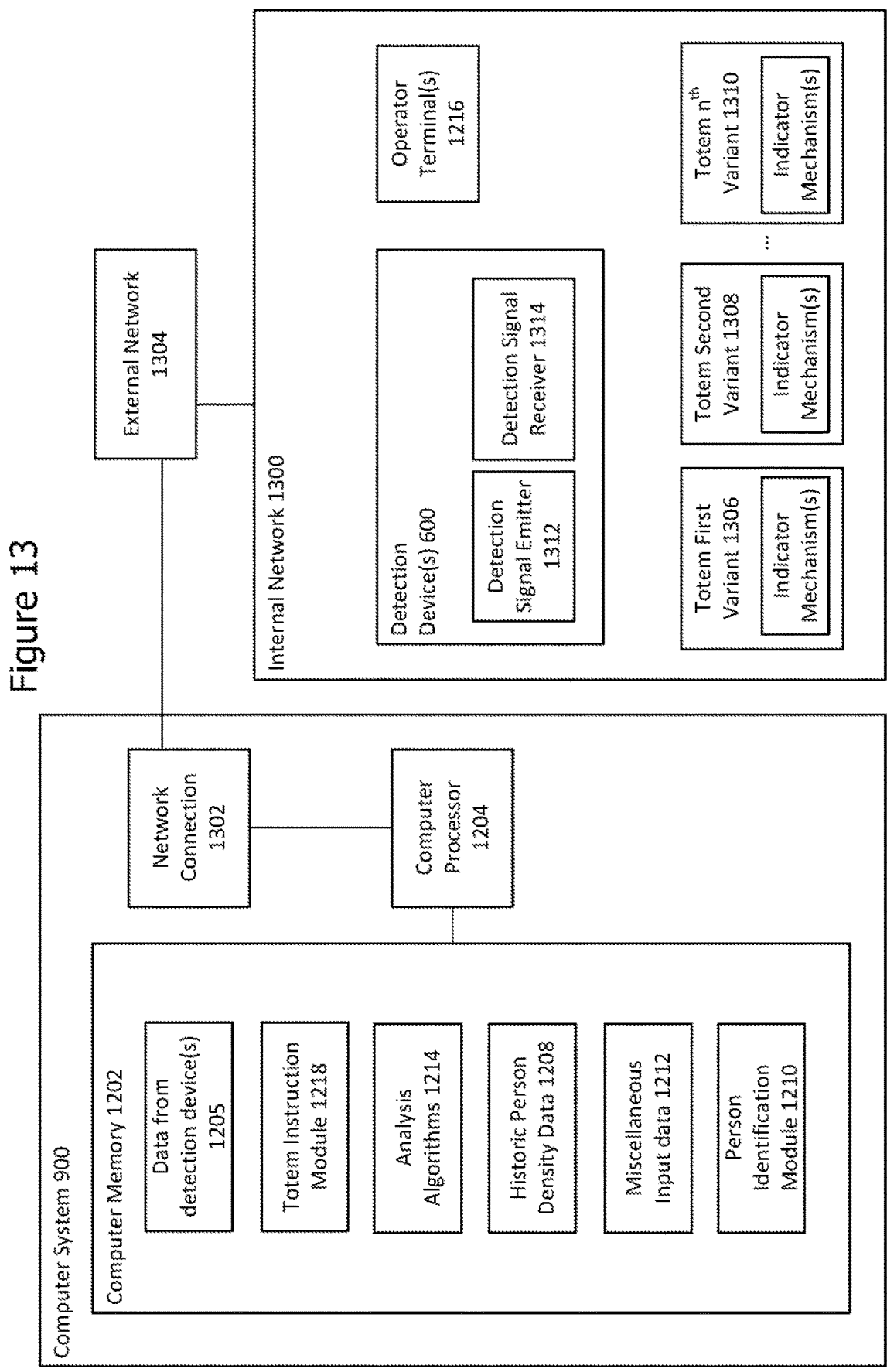
FIG. 13 is a system diagram showing the connections between the computer system, detection devices, and totems where the computer system is located outside of the network of the space being operated.

FIG. 13 is a system diagram showing the connections between the computer system, detection devices, and totems where the computer system is located outside of the network of the space being operated.

In one or more embodiments, the system may be comprised of a computer system 900 located across a network from the internal network 1300 of the space being monitored which is further comprised of a computer memory 1202 and a computer processor 1204. The computer memory may contain a variety of pieces of information including, but not limited to data received from detection devices 1205, historic person density data 1208, person identification software 1210, and miscellaneous data 1212 that the owner or operator of a space has deemed appropriate for the system to utilize which may include, but is not limited to, data regarding areas where the owner or operator wants to keep person density low, areas that may be under construction and inaccessible, or areas that have not been cleaned recently. The computer memory may also be configured to store data related instructions to the totems as well as analysis algorithms 1214 and other programs configured to analyze data from the detection devices 600.

In one or more embodiments, the computer system 900 further possesses a network connection 1302 that is connected to an external network 1304. Located potentially at the space being observed, the internal network 1300 would incorporate the detection devices 600, the operator terminals 1216, and any totem variants including a totem first variant 1306, a totem second variant 1308, and (n) other totem $n^{th}$ variants 1310. The detection devices 600 may be further comprised of a detection signal emitter 1312 and a detection signal receiver 1314.

The external network 1304 may be through an intermediary network, may be a global internet network, or some other configuration in which the computer system 900 has a network between it and the internal network 1300 of the space.

The computer system 900 may be comprised of a variety of different setups depending on the needs and resources of the space, including, but not limited to, an on-site computer system, an on-site computer network, a remote server with access to the space's network, a cloud service accessed through the space's network, or a hybrid of the foregoing. The computer system 900 is not specific to the network infrastructure it is run upon, and in some embodiments the computer system 900 may be comprised of multiple computers that may or may not be in multiple locations.

In some embodiments, the operator terminals 1216 may be on-site in or near the space being managed, or they may be located off-site and access the computer system 900 through a network or cloud interface. The operator or owner of the space can use the operator terminals 1216 to provide input to the system and allow an operator to input new data, revise the algorithms being run by the system, or manually override the indicators of the totems 100, along with any other administrative functionality that might be necessary to make use of the system. For example, the operator can use the operator terminals 1216 to add emergency information to totems 100 if there is an emergency, or if a specific circumstance has rendered some totems indicator's inaccurate due to a malfunction or other flaw in the system, the operator can use the operator terminal 1216 to manually operate the totems 100 and modify their indicators.

The system may also incorporate a module to instruct the totems, a totem instruction module 1218. Such module may contain software and algorithms configured to instruct the totems on the use of their indicators, such as putting out certain colors or patterns of light, certain types of patterns of sounds, or other indicia.

In some embodiments, the system may be configured with a person identification module, which may be comprised of software, algorithms, or other computational elements configured to take in data from the detection devices and run said computational elements on them to determine if one or more persons have been detected by the detection devices. In some cases, the system may combine data from multiple devices to improve the accuracy of the identification system. The system may utilize software or data such as computer image recognition, analysis of shapes or patterns of movement, data regarding average human builds, historical data, input from operators of the system, or other information.

FIG. 14 is a system diagram showing the connections between the computer system, detection devices, and totems where the computer system is located outside of the network of the space being operated.

In some embodiments, the system may be comprised of a computer system 900 which is further comprised of a computer memory 1202 and a computer processor 1204. The computer memory may contain a variety of pieces of information including, but not limited to data received from detection devices 1205, historic person density data 1208, person identification software 1210, and miscellaneous data 1212 that the owner or operator of a space has deemed appropriate for the system to utilize which may include, but is not limited to, data regarding areas where the owner or operator wants to keep person density low, areas that may be under construction and inaccessible, or areas that have not been cleaned recently. The computer memory may also be configured to store data related instructions to the totems as well as analysis algorithms 1214 and other programs configured to analyze data from the detection devices 600. The computer system 900 is then connected to the totems 100 and detection devices 60, as well as any terminals 1216 for the operators or owner of the space.

The computer system 900 may be comprised of a variety of different setups depending on the needs and resources of the space, including, but not limited to, an on-site computer system, an on-site computer network, a remote server with access to the space's network, a cloud service accessed through the space's network, or a hybrid of the foregoing. The computer system 900 is not specific to the network infrastructure it is run upon, and in some embodiments the computer system 900 may be comprised of multiple computers that may or may not be in multiple locations.

In one or more embodiments, the computer system 900 may be connected to the detection devices 600 and the totem variants via a network 1400. Such network 1400 may be internal to the space, or may have an intermediary. In such arrangements, the system may be connected to at least a first totem variant 1306, but may also incorporate a totem second variant 1308, along with other (n) totem variants, up to a totem $n^{th}$ variant 1310.

In some embodiments, the operator terminals 1216 may be on-site in or near the space being managed, or they may be located off-site and access the computer system 900 through a network or cloud interface. The operator or owner of the space can use the operator terminals 1216 to provide input to the system and allow an operator to input new data, revise the algorithms being run by the system, or manually override the indicators of the totems 100, along with any other administrative functionality that might be necessary to make use of the system. For example, the operator can use the operator terminals 1216 to add emergency information to totems 100 if there is an emergency, or if a specific circumstance has rendered some totems indicator's inaccurate due to a malfunction or other flaw in the system, the operator can use the operator terminal 1216 to manually operate the totems 100 and modify their indicators.

The system may also incorporate a module to instruct the totems, a totem instruction module 1218. Such module may contain software and algorithms configured to instruct the totems on the use of their indicators, such as putting out certain colors or patterns of light, certain types of patterns of sounds, or other indicia.

In some embodiments, the system may be configured with a person identification module, which may be comprised of software, algorithms, or other computational elements configured to take in data from the detection devices and run said computational elements on them to determine if one or more persons have been detected by the detection devices. In some cases, the system may combine data from multiple devices to improve the accuracy of the identification system. The system may utilize software or data such as computer image recognition, analysis of shapes or patterns of movement, data regarding average human builds, historical data, input from operators of the system, or other information.

FIG. 15 is a flow-diagram demonstrating how an embodiment of the invention may make determinations regarding person density in an area and indicate such density using an information totem.

Some embodiments may utilize a computerized program running on a computer processor to coordinate the indications provided by the information totems and/or display totems.

In such embodiments, the system may proceed in several steps, with a component of those steps comprising the detection devices detecting one or more persons in the area and transmitting detection data to the computer system 1500. Following that, the computer system analyzes the data coming from the detection devices 1502 in order to make a determination of person density 1504. The computer system processor then, on an area by area basis, determine whether each area has a high person density 1506 or a low person density 1508 as demonstrated. Then, for a situation in which an area has a high person density, the computer system instructs totems associated with such areas with high person density to activate their indicator mechanisms informing persons in the space of the high person density 1510. Similarly, if the computer system determines an area to have a low person density, then it can instruct the totems associated with such area to activate their indicatory mechanisms to inform persons in the space of the low person density 1512. In some embodiments, deactivation of the indicator mechanisms may function to indicate a person density level as well.

Once the indicator mechanisms have been activated by the computer system, the detection devices will continue to monitor the spaces to determine if the person density changes over time as shown in step 1514. The system then repeats the process depicted in FIG. 15 as the person density changes as shown in step 1516.

In some embodiments the computer system processor can make determinations regarding person density with more granularity, such as being able to differentiate between high, medium, or low density, or with even greater specificity. In such embodiments the indicator may change by small degrees depending on the level of density, with one extreme being one form of indicia and the other extreme another. For example, in one embodiment a high person density may be indicated by a red light, which may transition and become more yellow as the density becomes moderate, and then further transition to green when there are few people in a given area. The color scheme, if colors are used, may vary depending on the culture and location the system is implemented. How the system makes the determinations can be configured by the operator and can involve a variety of algorithmic and/or software solutions, or incorporate data provided by an operator or third party.

In some embodiments, where light is being used as an indication mechanism, the light may also be pulsed, strobed, or otherwise emitted in a specific pattern to further draw attention to the indicator or to provide urgency. For example, a rapidly strobing light may be used to indicate areas with a higher person density, while a light that slowly transitions on and off may indicate an area with low person density. A person skilled in the appropriate art may also use various combinations of colors and light patterns, along with any other indicia means, to provide instruction.

The invention may also incorporate other data for use in the determination algorithms. Such data may include historic data regarding person density, data related to events or holidays, data related to construction or closed portions of the space, data related to cleaning and sanitization patterns, or any other data the owner or operator of the space considers relevant. The computer system may then incorporate this data into its analysis. For example, if the space is an airport or other transit hub, and a particular event such as a holiday is going to occur, the system may be provided with that information and information regarding how such event may influence patterns, such as more people traveling to specific places, and thus the system may attempt to predict these patterns and utilize the totems at its disposal to guide persons. The additional data incorporated into the system may also involve adjusting tolerances for degrees of person density. For example, if there is a known viral pandemic, the system may consider a smaller number of persons near a totem or in a space to be high density, such as 3-4, while in other circumstances the system may consider 8-10 persons to be high density, though the exact values can vary widely depending on the space itself and considerations related thereto, such as its size or tire-code occupancy allowance. The owner or operator of a space can configure the invention as needed and may make adjustments at any time during the operation of the system using the operator terminals.

FIG. 16 is a flow-diagram demonstrating how an embodiment of the invention actively scan the space being monitored and make real-time determinations of how to utilize totems and their indicators.

In some embodiments, the system first takes the step of having the detection devices continuously detect persons in the areas being monitored and transmitting that data to the computer system as shown in step 1600. The computer processor component of the computer system then analyzes the data received from the detection devices as shown in step 1602. The analysis, on an area by area basis, can then make the determination of whether the person density has changed in each area as shown in step 1604. If the analysis shows that the person density has changed, as in step 1606, the computer system will first make a determination of whether the change in person density has met a high person density threshold as shown in step 1607 can instruct the totems associated with the areas identified as having changed person density to change their indicators if the change meets a certain threshold as determined by the owner or operator of the space as shown in step 1608. If the person density has not changed or met a certain threshold, such as the density increasing but not sufficiently increasing to make it a high person density area, as shown in step 1610, the computer processor will make that determination. Then, the computer processor will instruct the totems not to change their indicators as shown in step 1612. Following the determination as to whether to change the totem indicators, as show in steps 1608 and 1612, the detection devices will continue to monitor the areas as shown in step 1614. Lastly, the entire system repeats this process on an periodic basis to ensure safety as in step 1616.

The invention is capable of actively assessing person density in various areas of the space being monitored, and thus altering indications made by the totems so as to help mitigate the risks of high person density or other concerns of the owners and operators of the space.

The period by which determinations are made and the thresholds for person density calculations are up to the space operator or owner who is controlling or administrating the system. In some cases, the determinations made be made in fractions of seconds, or in some cases it could be minutes or even hours between determinations.

FIG. 17 is a diagram showing how the system may track an individual through the space in order to record when certain personnel have maintained or otherwise interacted with a space.

In some embodiments of the invention, the detection devices may detect a specific person or group of persons and transmit data on their location in a first area to the computer system as shown in step 1700. The computer system then records the location and time in which the person(s) were detected in a first area as shown in step 1702. Following that, the persons may move to a second area, and detection devices in that second area would detect them and transmit that data to the computer system, as indicated in step 1704. The computer system would then record the location and time in which the person(s) were located in the second area as demonstrated in step 1706. Then the computer system may instruct display devices or totems to provide information on where the person(s) have been detected and when they were last detected in each space as shown in step 1708. In some embodiments, this data may be shown as exact locations, a "ghost" image of the person moving through the space on a display, a heat-map showing the person(s) movements, or such other means to communicate the data to a viewer. The detection devices in the first area and second areas, as well as any other areas being monitored, then may detect the person(s) in them again if the person moves there, and that data is transmitted to the computer system as shown in step 1710. Lastly, the system will modify the data sent to display totems or other display means based on the updated data, as shown in step 1712.

As shown in FIG. 17, some embodiments of the system may be able to track individuals of groups of individuals determined to be maintenance or other owner or operator personnel through the space to determine whether the space is being maintained or to track other concerns. Such determination of whether individuals are owner or operator personnel can be made through specific uniforms, identification badges, identification tags, check-in devices, punch-in devices, or other means. Such determinations can be made in advance through preprograming by a system administrator, or in some embodiments the system may be configured to make the determination on its own.

Once a determination of personnel status has been made, certain embodiments of the invention can be configured to use the detection devices to track the movements of such personnel through the space, including, but not limited to, tracking when they remain in the same areas of a space for long periods, tracking when they move between different areas of the space, and watching for specific gestures or motions by the personnel. In some embodiments, the detection devices are configured to track body movements by certain personnel, and the system can be configured to look for specific motions. For example, some embodiments may possess detection devices capable of monitoring the movements of the arms of personnel, and may be configured to use the data from such detection devices to determine when maintenance personnel are cleaning the space, and from that data determine how recently a space was cleaned or disinfected by owner or operator personnel.

The exact way in which the data on personnel movements can vary depending on the needs of the operator or owner of the space, and might be shown as a heat-map or path. The period in which the data is captured and updated may also vary depending on the circumstances. For example, an operator that wants to show data related to cleaning personnel may have the data displayed in a heat-map format, such that viewers can see where the cleaning personnel have cleaned and how recently they did so.

The functionalities described herein are not envisioned to be tied to any one communication protocol, programming language or the like, and may be implemented in any convenient form of coding, computer language or the like where called for to implement a particular function in the algorithm.

Those skilled in the art will realize that the process sequences described above may be equivalently performed in any order to achieve a desired result. Also, sub-processes may typically be omitted as desired without taking away from the overall functionality of the processes described above.

While the above example of a computing environment is one possible implementation, those skilled in the art could also attempt to implement the present invention in nearly any environment capable of implementing a computer, such as in a suitably programmed video game or utilizing a mechanical implementation. For example, practitioners have created virtual "computers" in popular sandbox video games such as Minecraft, and, given the proper tools, could implement this invention in such a game, or in other media.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or distributively process by executing some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

What is claimed is:

1. A system for efficient distribution of persons within a space, the system comprising:
   one or more detection devices configured to collect detection data;
   one or more display totems, the display totem comprising one or more indicators configured to emit one or more indicia when instructed wherein the one or more indicia are comprised of at least one of: a light or sound;
   a computer memory containing at least one set of display layout data relating to the layout of the one or more display totems and a space in which they are located;
   a computer processor coupled to the memory and configured to perform operations including at least:

obtaining data from the one or more detection devices and convert it into one or more sets of detection data;
   identifying individual persons from the detection data and converting such identified person data into one or more sets of person location data wherein said person location data identifies the individual persons in the space as persons but is not specific to any other characteristics of such persons;
   analyzing the one or more sets of person location data to determine what areas of the space recorded high numbers of persons;
   associating the person location data with the display layout data and determining where the persons are located in relation to the display totems; and
   instructing the one or more display totems to activate one or more of its one or more indicators to convey information to such persons, using the person location data and layout of the space to encourage certain of the persons to move towards certain of the display totems.

2. The system of claim 1, the system further comprising one or more information totem, the information totem comprising an informational screen, and wherein the computer processor is further configured to perform operations including at least:
   instructing the one or more information totems to display information regarding person location data on its informational screen.

3. The system of claim 1, wherein the indicia of the one or more display totems is a light and the computer memory further contains information regarding maximum occupancy thresholds for the areas surrounding each of the one or more display totems, and the computer processor is further configured to perform the operation of:
   determining when the one or more sets of person location data indicate that there are more persons in an area than the maximum occupancy threshold allows; and
   instructing the one or more display totems to display a first color with its one or more indicia to indicate the maximum occupancy threshold has been exceeded.

4. The system of claim 1, wherein the one or more detection devices are configured to detect individual persons on a constant basis and continuously provide data on individual persons detected to the computer processor.

5. The system of claim 4, wherein the computer processor is further configured to update the one or more sets of person location data based on the most recent data provided by the detection devices.

6. The system of claim 5, wherein the computer processor is further configured to perform the operation of analyzing the one or more sets of person location data and compare it to the layout data in the computer memory to determine areas with large numbers of persons.

7. The system of claim 6, wherein the computer processor is further configured to perform the operation of instructing the one or more display totems to deactivate one or more of its indicators based on the analysis of the updated one or more sets of person location data.

8. The system of claim 7, wherein the one or more display totems has at least two colors.

9. The system of claim 8, wherein the computer processor is further configured to perform the operation of instructing the one or more display totems to change between its two or more colors based on the current analysis of the one or more sets of person location data.

10. The system of claim 2, wherein the computer processor is further configured to determine a route through the space that minimizes proximity to other persons and instruct the informational display of the one or more information totems to display the route.

11. The system of claim 9, wherein the one or more detection devices are configured to detect specific individual persons and relay the information about their location to the computer processor.

12. The system of claim 11, wherein the computer processor is further configured to record information about the movement of the specific individual persons detected by the one or more detection devices to the computer memory and analyze patterns in the specific individual persons' movement.

13. The system of claim 12, wherein the computer processor is further configured to use the analysis of the patterns of the specific individual persons' movement to determine whether certain functions have been performed in a space, and relay that information to an administrator.

14. The system of claim 13, the system further comprising one or more information totems, the one or more information totems comprising an informational screen, and wherein the computer processor is further configured to perform operations including at least instructing the informational screen of the one or more information totems to display data regarding the analysis of specific individual persons movement.

15. The system of claim 14, wherein the one or more information totems is configured with a pre-programmed information to display, but is further configured such that the computer processor can override the pre-programmed information to display and replace it with other information provided by the computer processor.

16. The system of claim 15, wherein the computer processor is further configured to perform the function of analyzing person location data patterns and record the analysis to the computer memory; analyzing past person location data patterns; providing analytics information based on the analysis of the past person location data; and processing the past person location data using an algorithm to predict future person location patterns based on the past person location data.

17. The system of claim 16, wherein the computer processor is further configured to take in additional data regarding conditions that may affect person density and combine that with the results of the algorithm, and instruct the one or more information totems based on the predicted future person location patterns based on the algorithm and additional data.

18. The system of claim 1, wherein the one or more detection devices are configured to recognize faces.

19. A system for efficient distribution of persons within a space, the system comprising:

one or more detection devices comprising at least a LiDAR detector and LiDAR emitter wherein the one or more detection devices are configured to collect detection data;

a space comprised of one or more sub-spaces;

one or more display totems, the display totem comprising one or more LED indicator lights configured to emit one or more colors when illuminated wherein the one or more display totems are positioned within the one or more sub-spaces of the space;

a computer memory containing at least one set of display layout data relating to the layout of the one or more display totems and the sub-space in which each is located;

a computer processor coupled to the memory and configured to perform operations including at least:

obtaining data from the one or more detection devices and convert it into one or more sets of detection data;

identifying individual persons from the detection data and converting such identified person data into person location data wherein said person location data identifies the individual persons in the space as persons but is not specific to any other characteristics of such person;

analyzing the one or more sets of person location data to determine which sub-spaces of the space recorded high numbers of persons;

associating the person location data with the display layout data and determining where the persons are located in relation to the one or more display totems;

determining whether the number of persons near each of the one or more display totems meets or exceeds a preset value;

instructing the one or more display totems to activate or deactivate one or more of its one or more indicators based on whether the number of persons near that one of the one or more display totems meets or exceeds the preset value using the person location data and layout of the space to encourage certain of the persons to move towards certain of the display totems.

20. A method of encouraging efficient distribution of persons in a space, the method comprising:

using at least one LiDAR detector to generate data about objects in one or more spaces;

using a computer processor to analyze the data generated by the least one LiDAR detector;

determining what objects in the space detected by the least one LiDAR detector are persons and identifying each individual person generally;

comparing the locations of the persons detected by the at least one LiDAR detector to data comprising the layout of the one or more spaces;

determining based on the comparison whether the density of persons in the one or more spaces meets or exceeds a set of preset values;

instructing one or more information totems each comprising at least an indicator associated with the one or more spaces where the density of persons met or exceeded the set of present values for that space to set their indicators to a first setting;

instructing one or more information totems each comprising at least an indicator associated with the one or more spaces where the density of persons did not exceed the set of present values for that space to set their indicators to a second setting;

repeating the foregoing steps any time the density of persons in the one or more spaces meets or exceeds a set of preset values.

* * * * *